INVENTOR.
Theodore W. Kenyon
BY
Kenyon & Kenyon
ATTORNEYS

March 22, 1966 T. W. KENYON 3,241,378

ERECTOR MECHANISM

Filed Feb. 15, 1961 11 Sheets-Sheet 2

INVENTOR.
Theodore W. Kenyon

BY Kenyon & Kenyon
ATTORNEYS

March 22, 1966 T. W. KENYON 3,241,378

ERECTOR MECHANISM

Filed Feb. 15, 1961 11 Sheets-Sheet 3

INVENTOR.
Theodore W. Kenyon
BY Kenyon & Kenyon
ATTORNEYS

March 22, 1966 T. W. KENYON 3,241,378

ERECTOR MECHANISM

Filed Feb. 15, 1961 11 Sheets-Sheet 4

INVENTOR.
Theodore W. Kenyon
BY
Kenyon & Kenyon
ATTORNEYS

March 22, 1966 T. W. KENYON 3,241,378

ERECTOR MECHANISM

Filed Feb. 15, 1961 11 Sheets-Sheet 5

INVENTOR.
Theodore W. Kenyon
BY
Kenyon & Kenyon
ATTORNEYS

INVENTOR
Theodore W. Kenyon

BY Kenyon & Kenyon
ATTORNEYS

INVENTOR.
Theodore W. Kenyon
BY
Kenyon & Kenyon
ATTORNEYS

March 22, 1966 T. W. KENYON 3,241,378

ERECTOR MECHANISM

Filed Feb. 15, 1961 11 Sheets-Sheet 8

INVENTOR.
Theodore W. Kenyon
BY Kenyon & Kenyon
ATTORNEYS

March 22, 1966 T. W. KENYON 3,241,378

ERECTOR MECHANISM

Filed Feb. 15, 1961 11 Sheets-Sheet 9

INVENTOR.
Theodore W. Kenyon

BY Kenyon & Kenyon

ATTORNEYS

INVENTOR.
Theodore W. Kenyon
BY
Kenyon & Kenyon
ATTORNEYS

INVENTOR
Theodore W. Kenyon
BY Kenyon & Kenyon
ATTORNEYS

United States Patent Office 3,241,378

Patented Mar. 22, 1966

3,241,378

ERECTOR MECHANISM

Theodore W. Kenyon, R.F.D. 2, Old Lyme, Conn.

Filed Feb. 15, 1961, Ser. No. 89,545
16 Claims. (Cl. 74—5.43)

This invention relates to an erection device for a vertical gyroscope and more particularly to an erection system which is achieved uniquely by utilizing reaction forces of jets of liquid emanating from ports into liquid of the same composition surrounding the entire gyro gimballing system.

Objects and features of this invention are the provision of a novel erection system for a gyroscope utilizing reaction forces of jets of liquid emanating from ports into liquid of the same composition surrounding the entire gyro gimballing system which is covered by a closing container.

Other objects and features of this invention are the provision of novel means for directing jet fluid to said outlets or ports, novel valve means for controlling the discharge of jet fluid from selected of said outlets, novel gravitationally controlled sensor means for controlling operation of said valve means, novel negative feedback means for opposing movement of the gravitationally controlled sensor means and balancer weight means together with means for altering relative positions of said balancing weight means and also the provision of pumping means within the container for directing jet fluid from the container for use as the erector jet fluid.

Additional objects and features of the invention are the provision of novel jet fluid operated erector means for gyroscopes and novel controls for the jet fluid erector streams emanating from jet fluid ports positioned to provide erector action by reaction forces of jet fluid emanating from the ports into confined liquid of the same composition surrounding the entire gyro gimballing system.

Yet other objects and features of the invention are the provision of a novel method of effecting gyro erecting action of a gyroscope.

Still other objects and features of the invention are the provision of effective and relatively simple structural components for effecting the aforedescribed erecting action.

Further objects and features of the invention are the provision of a readily assembled arrangement that is trouble free in operation and fully effective in producing erecting action with minimal input power and minimal fluid volume in the erector system.

Other objects and features of the invention will become apparent from the following specification and the accompanying drawings forming a part hereof wherein.

*Schematic system (FIGURES 1–3)*

Figure 2:
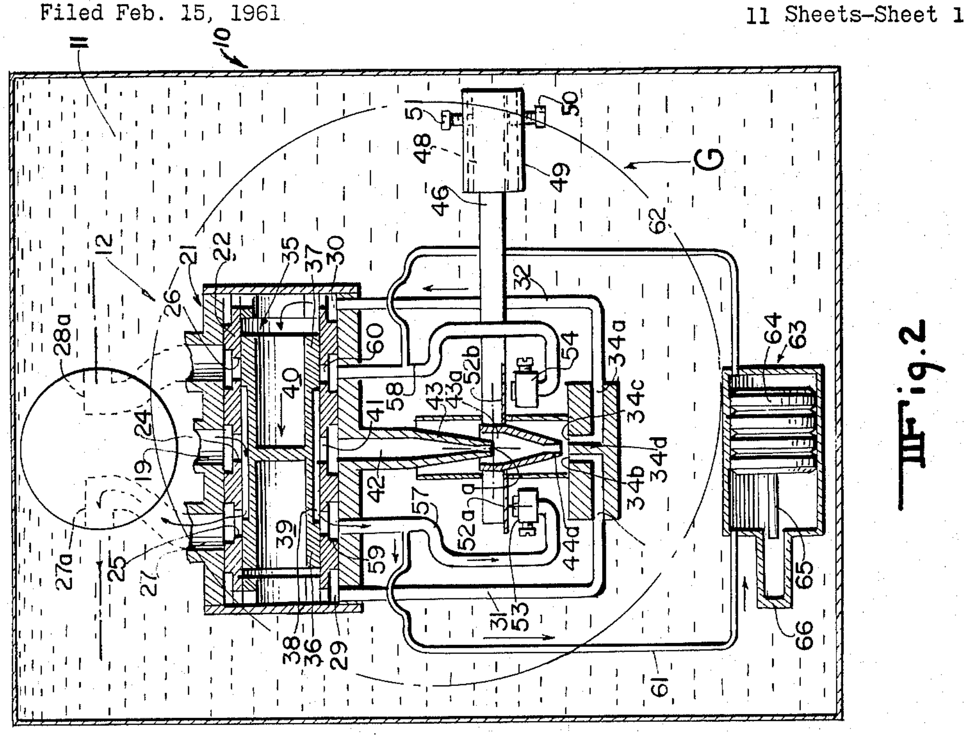
FIGURE 2 is a similar schematic view with the parts in a second control position.
Figure 1:
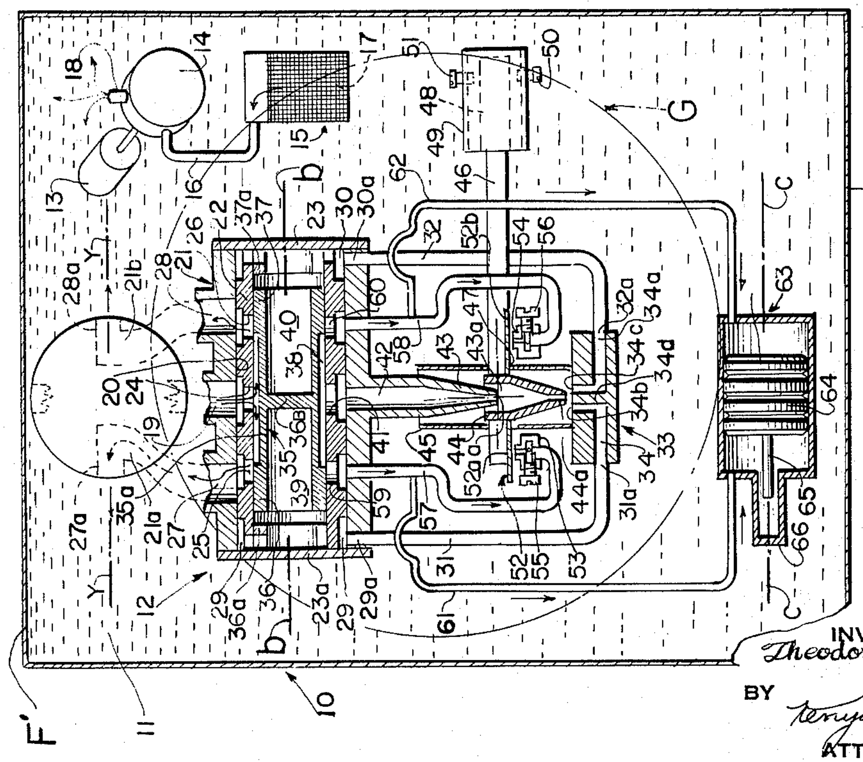
FIGURE 1 is a schematic section of an erection system embodying the invention with parts shown in one control position.
Figure 3:
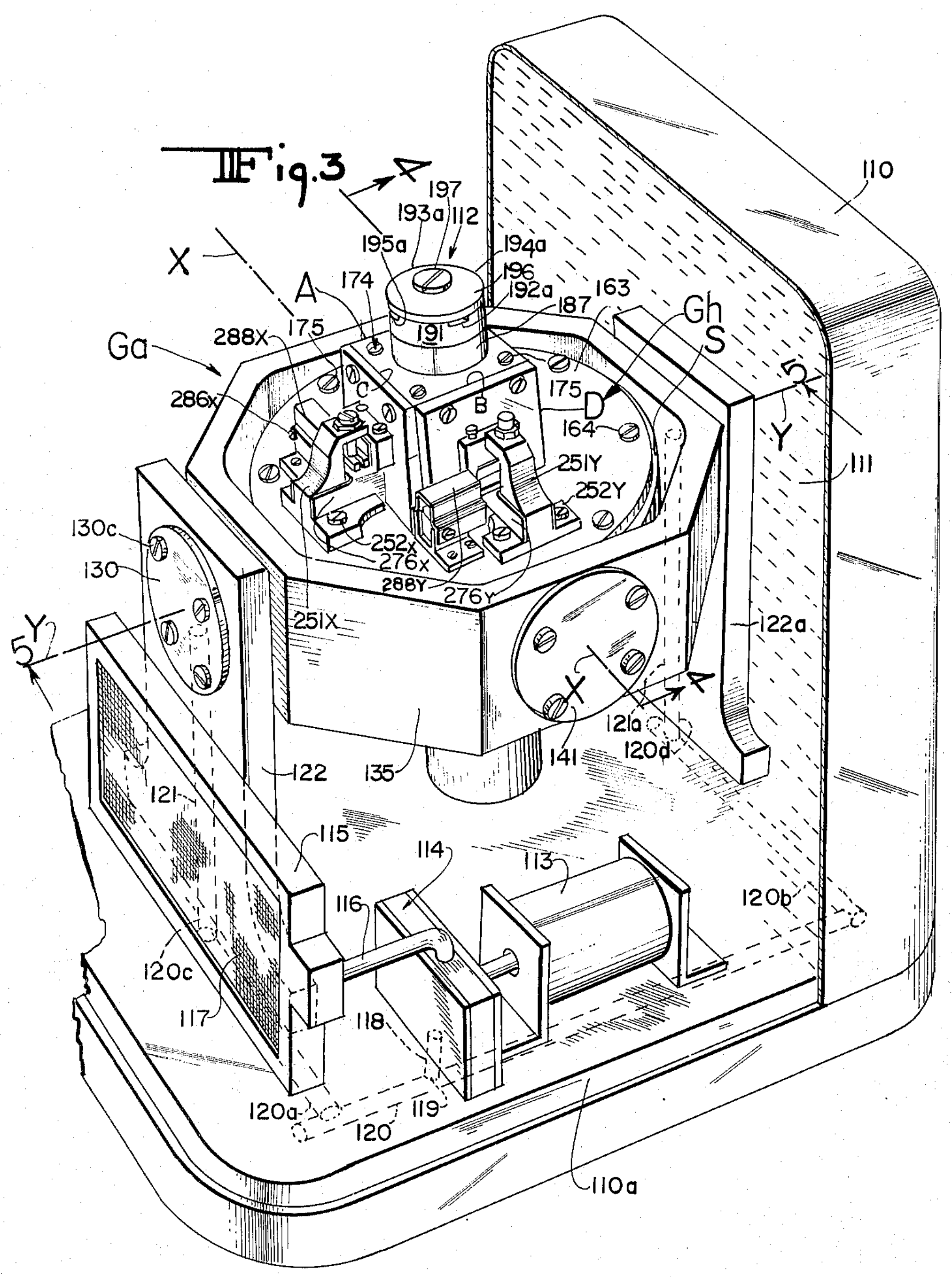
FIGURE 3 is a perspective view, partially broken away of a working embodiment of the invention.

Referring now to the drawings and first to FIGURES 1, 2 and 3, the reference character 10 denotes an enclosing casing filled entirely with a high specific gravity, preferably transparent, liquid 11 for example Dow-Corning Silicone #200 which is non-corrosive and non-conductive. Any other similar liquid may be used.

The casing 10 also includes a gyroscope G which includes a jet type erector system 12 for each of two mutually perpendicular X—X and Y—Y gimbal axes, only one of said systems 12 for the X—X gimbal axis being shown because the one for the Y—Y axis is identical. Also mounted within the casing 10 and completely submerged in the liquid 11 are a motor 13, and a pump 14 driven by the motor 13. A filter 15 is connected to the pump intake line 16 so that liquid drawn in at the intake 17 of the filter 15 must necessarily pass through the latter prior to its transit through the pump and ejection at the delivery conduit 18 of the pump.

Operation of the pump 14 by its motor 13 forces fluid under pressure to the input passageway 19 of the erector system 12. This passageway 19 opens into the wall of a cylindrical bore 20 in the housing 21 of the erector system 12. A tubular valve seat 22 is mounted in the bore 20 and is maintained in a fixed position therein as by a force fit. The longitudinal axis *b—b* of valve seat 22 is aligned in parallelism with the Y—Y gimbal axis of gyro G as will be described. End plugs or caps 23 and 23*a* close off opposite ends of said bore 20. A port 24 in the valve seat 22 registers with the inner terminal of the input passageway 19 and is preferably centrally located relative to the length of the bore of said valve seat 22. Equispaced ports 25 and 26 at opposite sides of the port 24 register respectively with erection jet passages 27 and 28 whose outlet openings 27*a* and 28*a* open in opposite directions along the Y—Y axis in the upper portions 21*a* and 21*b* of the housing 21. Additional annular liquid power input ports 29 and 30 are provided adjacent opposite ends of the valve seat 22. These ports 29 and 30 communicate through inlet passageways 29*a* and 30*a* in housing 21 respectively with the separate conduits 31 and 32. The terminals 31*a* and 32*a* of these conduits 31 and 32 are connected at opposite faces of a block receiver 33 which is fixedly mounted in any suitable way. These terminals communicate respectively with passageways 34 and 34*a* in the block receiver 33. The passageways 34 and 34*a* terminate at open mouths 34*b* and 34*c* in the upper face of the block receiver 33 being separated by a partition 34*d* a distance of approximately a few hundredths of an inch, for example .032".

A cylindrical tubular piston power valve 35 having oppositely located head portions 36 and 37 is mounted slidably within the tubular valve seat 22. This power valve 35 is shorter in length than valve seat 22 so that it may slide along axis *b—b* reciprocally to and fro between the end caps 23 and 23*a* that close the ends of bore 20 and valve seat 22. The ends of head portions 36 and 37 are provided with stop members 36*a* and 37*a*. A partition 36*b* divides the tubular bore of valve 35 into two separate chambers opening respectively towards the opposite ends of tubular valve seat 22.

A stem part 35*a* of the valve 35 lying between the pair of head portions 36 and 37 is of smaller diameter than the interior of the valve seat 22 and with the inner surface of the latter defines an annular chamber 38. This chamber 38 is in direct communication at all times with the input port 24 in valve seat 22 and input passageway 19 so that chamber 38 is always filled with liquid under pressure which is delivered to said passageway 19 by the pump 14.

The head portions 36 and 37 normally when valve 35 is centrallized almost close off the respective ports 25 and 26. Since the power valve 35 is shorter than the length of valve seat 22, it with its partition 36*b* thus provides oppositely located chambers 39 and 40 between the partition 36*b* and plug 23 and partition 36*b* and end plug 23*a*. These chambers 39 and 40 communicate directly with the respective annular ports 29 and 30 in valve seat 22. The inlet passageways 29*a* and 30*a* in the housing 21 also are in direct communication with the ports 29 and 30 and thus permit valve operating fluid to enter or bleed from the chambers 39 and 40 as required to effect reciprocal shift of the valve 35 as will hereinafter be described. The open mouths 34*b* and 34*c* in the upper face of block receiver 33 serve as valve operating fluid power intake ports for the valve operating fluid which is delivered to them as will be presently described.

An outlet port 41 is provided in the valve seat 22 lying substantially diametrically opposite the intake port 24. Outlet port 41 communicates with a passageway 42 in housing 21 which is extended laterally of the axial direction of valve seat 22 and downwardly toward the two intake holes or openings 34*b* and 34*c* in block receiver 33, said passageway terminating in a fixed venturi-like jet nozzle 43 whose outlet 43*a* lies a substantial distance above the opening mouths 34*b* and 34*c*. The said power delivery jet outlet 43*a* of the fixed jet nozzle 43 projects into the inlet or mouth of a movable venturi-like jet 44 whose outlet orifice 44*a* is normally maintained substantially centrally located above the upper face of the partition 34*d* between the two open inlet mouths 34*b* and 34*c* in the upper face of block receiver 33. The two jets 43 and 44 are surrounded by a tubular random flow shield 45 which projects upwardly from the upper face of block receiver 33 and concentrically about the two jets 43 and 44. This shield 45 has a larger internal diameter than the peripheral or outer diameters of the jets 43 and 44 and at its upper open end terminates well above the level of the outlet 43*a* of the fixed jet nozzle 43.

The movable jet 44 is carried by a sensor rod or arm 46 which is pivotally supported to swing about a normally vertical sensor axis *a* that intersects the longitudinal normally horizontal axis of the fixed jet 43, and is also perpendicular to the longitudinal axis *b—b* of the piston power valve 35 for purposes of elimination of coercion on the gyro gimbal. The sensor rod or arm 46 projects laterally outwardly of appropriate slots 47 in the random flow shield 45. These slots 47 are dimensioned to permit pivotal motion of the sensor rod or arm 46 about its pivot axis *a*. The sensor rod or bar 46 has a pendulum weight 48 at one side of the pivot axis *a* which projects into a fixed, tubular, random flow shield 49 between a pair of oppositely located, spaced apart adjustable sensor travel or limit stops 50 and 51. These stops 50 and 51 are carried by the fixed random flow shield 49. They are threaded so as to be individually adjustable to provide selectable limit stops for clockwise or counterclockwise gravitational swing of sensor rod or arm 46 and sensor weight 48 about pivot axis *a*. In the aforedescribed normal disposition of the jet orifice 44*a* centrally over the partition 36*d* between open mouths 34*b* and 34*c* of block receiver 33, the weight 48 of said sensor rod 46 lies substantially centrally disposed between the two adjustable stops 50 and 51 as seen in FIGURE 1.

The jet 44 and its orifice 44*a* are tiltable about the pivot axis *a* in either a clockwise or counterclockwise direction to direct orifice 44*a* from its aforementioned normally centralized position between the mouths 34*b* and 34*c* toward a position overlying either of these mouths depending upon the direction of gravitational tilt of sensor arm 46 about vertical axis *a* so that the jet discharge emitted by nozzle orifice 44*a* will be directed into the particular mouth or inlet orifice 34*b* or 34*c* toward which it is directed when a tilt in one direction or the other of jet nozzle 44 is effected. The extent and direction of tilt will of course determine the relative disposition of the jet orifice 44*a* with respect to the mouth or inlet orifice 34*b* or 34*c* toward which it has been tilted and thus serve as a regulatory arrangement for the quantitative amount and velocity of jet fluid that will actually enter the particular mouth or inlet orifice 34*b* or 34*c* as the case may be.

In order to effect negative fluid feedback counter to the gravitational tilt of the sensor arm 46 and jet nozzle 44, a feedback reaction plate 52 comprising oppositely directed vanes or blades 52*a* and 52*b* is secured to said rod or bar 46 at nozzle 44. These vanes or blades 52*a* and 52*b* respectively overlie the outlet ports of auxiliary fixed feedback jets 53 and 54. Needle valves 55 and 56 of conventional adjustable type provide a control for feedback jet fluid stream delivery from the outlet ports of said jets 53 and 54. The said jet ports respectively are directed toward the underfaces of the respective blades 52*a* and 52*b* being spaced from the latter so as not to physically impede tilting swing of jet nozzle 44 about sensor tilt axis *a* under action of gravity within the limits permitted by the respective sensor travel limit stops 50 and 51. Feedback jet fluid delivered via the output port of fixed reaction jet nozzle 53 will tend to effect clockwise tilt of sensor arm 46 counter to counterclockwise gravitational tilt thereof by impingement against vane or blade 52*a* thus tending to swing jet nozzle orifice 44*a* toward its central position with respect to mouths or inlet orifices 34*b* and 34*c*. This condition is illustrated in FIGURE 2. On the other hand impingement of feedback jet fluid delivered via the outlet port of fixed reaction jet nozzle 54 against vane or blade 52*b* will tend to effect counterclockwise tilt of sensor arm 46 counter to clockwise gravitational tilt thereof by impingement against vane or blade 52*b* thus tending to swing jet orifice 44*a* toward central position with respect to mouths or inlet orifices 34*b* and 34*c*. These feedback jets 53 and 54 serve purposes presently to be described.

Condits 57 and 58 connect the respective fixed reaction or feedback jets 53 and 54 to the respective ports 59 and 60 which are provided in the tubular valve seat 22. These ports 59 and 60 are equispaced and lie on opposite sides of the main outlet port 41 in said tubular valve seat 22. Capillary conduits 61 and 62 are connected respectively at one of their ends to communicate with the respective conduits 57 and 58. The other ends of the respective conduits 61 and 62 are connected to communicate with opposite ends of a balancing cylinder 63 which contains a slidable balance weight 64. A position indication rod 65 attached to one end of the weight 64 is movable in the preferably transparent closed sighting sleeve 66 provided at one end of cylinder 63. This sleeve 66 provides a viewing port for the rod 65 to enable visual determination of the position of the balance weight 64 in the balance cylinder 63. It is used primarily during initial calibration of the entire system. The longitudinal axis *c—c* of balance weight 64 and its cylinder 63 lies parallel with or aligned with the axis *b—b* of the power valve 35.

The system just described is located in parallelism with for example the Y—Y gimbal axis of the gyro G. In other words, the axes *b—b* and *c—c* are parallel with the Y—Y gimbal axis of the gyro.

A second identical system (not shown) is located at 90° with the system described so that its power piston axes and balance cylinder axis are parallel with the X—X gimbal axis of the gyro. It is necessary to have these two cross arranged identical systems to effect complete gyro erection on both the X—X and Y—Y axes.

*Operation of schematic system*

It is to be noted that the outlet ports 25, 26, 59 and 60 of the valve seat 22 in the normal centrally located position of the power valve 35 are almost closed off from communication with the fluid input chamber 38. There is, however, a small overlap of chamber 38 with respect to all four of the said outlet ports in this normal central position of said valve so that some bleed occurs of hydraulic input power supplied to chamber 38 by operation of pump 14 through the hydraulic power input passageway 19 and port 24. The said normal centrally located position of main power valve 35 is that intended to occur when gimbal axis X—X of the gyro is horizontal. The slight bleeds from chamber 38 of the hydraulic fluid fed thereto via ports 25 and 26 are of like magnitude and at this time provide equal and oppositely directed discharges of bleed erector jet fluid via the oppositely directed erector jet openings 27*a* and 28*a* into the body of fluid 11 within the casing 10. The opposite equal reactions produced in the fluid body 11 of these bleed jets cancel each other out. The slight bleeds at this time also from chamber 38 via ports 59 and 60 pass out through feedback conduits 57 and 58 to the feedback reaction jets 53 and 54 and impinge against the respective feedback reaction plate vanes 52*a* and 52*b*. The respective needle valves 55 and 56 are adjusted so that the bleed flow from the respective reaction jets that impinge against the vanes 52*a* and 52*b* balances the reaction plate 52 and sensor arm on the vertical pivot axis *a* so that the weight 48 of sensor arm 46 then lies midway between the two limit stops 50 and 51. The capillary conduits 61 and 62 also deliver bleed fluid from the respective feedback conduits 57 and 58 to opposite sides of balance weight 64 in balancing chamber 63.

At this time hydraulic fluid from chamber 38 also passes outwardly of the latter via port 41 and to power jet nozzle 43*a* and from the latter to power jet nozzle outlet 44*a* against the outer surface of partition 34*d* of the block receiver 33 over which it then lies. The emerging jet stream at 44*a* striking the surface of this partition 34*d* is divided and enters both opening 34*b* and 34*c* equally, thus producing no effect on the piston. This balanced arrangement persists as long as no tilt or displacement of the gyro assembly occurs about the Y—Y axis.

Assume now that the surface F–F′ of the gyro assembly is inclined about the Y—Y axis with rotor wheel G rotating clockwise so that F′ lies below and F lies above horizontal. This is the condition shown in FIGURE 2. Gravity causes the sensor arm 46 to tilt counterclockwise (FIGURE 2) about vertical axis *a* and likewise tilts movable sensor operated jet 44 counterclockwise causing its outlet orifice 44*a* to be directed toward sensor orifice 34*c* directing the emerging power jet stream from jet orifice 44*a* into said sensor orifice 34*c* whence it is forced via passageway 34*a* in block receiver 33 and conduit 32 and port 30 into the right chamber 40 of the power valve 35. This increases fluid pressure in said chamber 40 relative to that in chamber 39 effecting a leftward displacement of power valve 35 as seen in FIGURE 2. This forces fluid from chamber 39 to bleed outwardly thereof via port 29, conduit 31 and opening 34*b*.

The leftward displacement of valve 35 causes head 37 of the power valve to close off ports 26 and 60 completely while head 36 having also been displaced leftwardly further uncovers both ports 25 and 59. A large volume of pumped jet fluid flow from chamber 38 via port 25 and passage 27 to erector jet outlet 27*a* now occurs. Since erector jet flow from erector jet outlet 28*a* has at this time been cut off by closing of the port 26, the erector jet stream emerging at outlet 27*a* into the main body of fluid 11 provides a reactor erector correcting torque force which tends to restore the gyro assembly to its initial level condition shown in FIGURE 1, i.e. with surface F–F′ horizontal.

At the same time since port 59 has been more widely opened and port 60 has been closed only jet fluid from sensor signal reaction jet 53 can flow while that from sensor signal reaction jet 54 has been cut off. This feedback jet flow tends to swing sensor arm 46 clockwise negatively of the gravitational tilt tendency towards its other limit stop 50. This negative swing influence tends to direct the jet from orifice 44*a* into opening 34*b* and hence to refill chamber 39 tending thus to restore cylinder 35 to its initial balanced condition shown in FIGURE 1. This swing of sensor arm 46 occurs during existence of the erector jet stream issuing at erector jet orifice 27*a*. When restoration of surface F–F′ to level condition is complete the balanced condition of FIGURE 1 recurs at which time the power jet stream issuing from the now centrally restored position of jet orifice 44*a* relative to openings 34*b* and 34*c* will not effect further movement of power piston 35.

The same type of erector action occurs with emission of an erecting jet stream from erector jet nozzle 28*a* rather than erector jet nozzle 27*a* if the initial unbalance is one wherein F′ is higher and F is lower than a horizontal position. The balance weight 64 under influence of opposing pressures in capillary lines 61 and 62 tends at all times to try to effect balance in the system and maintenance in its non-tilted condition of FIG. 1.

The other like system (not shown) provides like erecting action with respect to tilts about the Y—Y axis.

With either of these two erector systems, the power valve 35 has its position controlled by the sensor weight 48 and sensor arm 46. Power valve 35 thus valves jet fluid to the correct erector jet outlet, e.g. 27*a* or 27*b* as the case may be, to produce torque by reaction with the main body of the same fluid in the casing and thereby produce gyro precession in a direction to correct the vertical error that caused the sensor weight and sensor arm motions. The system shown in FIGURES 1 and 2 provides for erecting action on one X—X axis of the gyro, and a similar system is provided to provide jet torque components operating in the gyro X—X axis to provide erection in the Y—Y axis displaced 90° from the described X—X axis.

An advantage of the device is that a very accurate erection system can be obtained with a small set of components and with very low power input to the erection system. For example, in the practical embodiment to be described, erection is normally achieved with approximately one watt of input power in one cubic inch of erector equipment in the erector system.

In addition, an automatic self balancing or integrating erection system is readily obtained to provide an even greater accuracy with a gyro that need not itself be accurately balanced.

*Practical embodiment*

A practical embodiment of the invention as just noted is depicted in FIGS. 3 et seq. Referring to these figures, the reference character 110 denotes an enclosing casing which is filled with high specific gravity liquid 111 of the same type as liquid 11 hereinbefore described. A gyroscope *Ga* is mounted in this casing as will be described. The jet type erector system 112 is carried by the gyro *Ga* being supported, for example, on the upper surface S of the gyro-rotor housing *Gh*. An electric motor 113 is secured to the base 110*a* of casing 110 and a gear type pump 114, also secured to base 110*a* is adapted to be driven by the motor 113. A filter 115 also secured to base 110*a* is connected to the pump intake line 116 so that liquid 111 within casing 110 that is drawn in at the intake 117 of the filter 115 when the motor 113 is driven must necessarily pass through the filter 115 prior to its entry into and passage through the pump 114.

The outlet 118 of the pump 114 overlies an inlet 119 of a distributing passageway 120 (FIGS. 3, 4 and 5), which is provided in the base 110*a*. Branch passageways 120*a* and 120*b* each communicating with the distributing passageway 120 are provided in said base 110*a* and these passageways in turn have outlets 120*c* and 120*d* (FIGS. 3, 4 and 5) which communicate respectively with vertical passageways 121 and 121*a* provided in the respective oppositely located vertical gyro support posts 122 and 122*a* which are secured to the base 110*a*. The pump 114 thus serves to supply fluid pumped from the fluid 111 in casing 110 under pressure to both the vertical passageways 121 and 121*a* in respective gyro supports 122 and 122*a* and this fluid under pump created pressure is utilized to provide the jet erection torques as will be presently described.

The spaced-apart vertical gyro support posts 122 and 122*a* have axially aligned openings 123, 123*a* (FIG. 5) in which ported ball bearing supports 124, 124*a* (FIGS. 5 and 12) are mounted. These ball bearing supports 124 and 124*a* are generally ring sheaped, being provided with an annular surface groove 125, 125*a* between a pair of spaced inner and outer annular flanges 126, 126*a*, 127, 127*a*. The inner flanges 126, 126*a* of each support fit within one of the respective openings 123 and 123*a*. The annular grooves 125 and 125*a* respectively communicate with the upper open ends of passageway 121 or 121*a* in the respective supports 122, 122*a*. The inner faces of outer flanges 127, 127*a* abut the outer face of respective support posts 122 and 122*a* to maintain the bearing supports 124 and 124*a* in place.

A plurality of ports 18 or 128*a* in the annular walls of grooves 125 and 125*a* provide fluid passage communications from the respective open upper ends of passageways 121 and 121*a* into the outward spaces 129 and 129*a* externally of the bearing supports 124 and 124*a*. These outward spaces 129 and 129*a* are closed off by the respective cover plates 130 and 130*a* which are secured as by bolts 130*c* and 130*d* to respective support posts 122 and 122*a* and are insulated from these posts and with respect to flanges 127 or 127*c* by pairs of packing and insulation rings 131 and 131*a*. Electrical contact springs 132 and 132*a* are carried insulatively between the ring pairs 131 and 131*a* located between these end plates 130 and 130*a* for purposes presently to be described.

Figure 4:
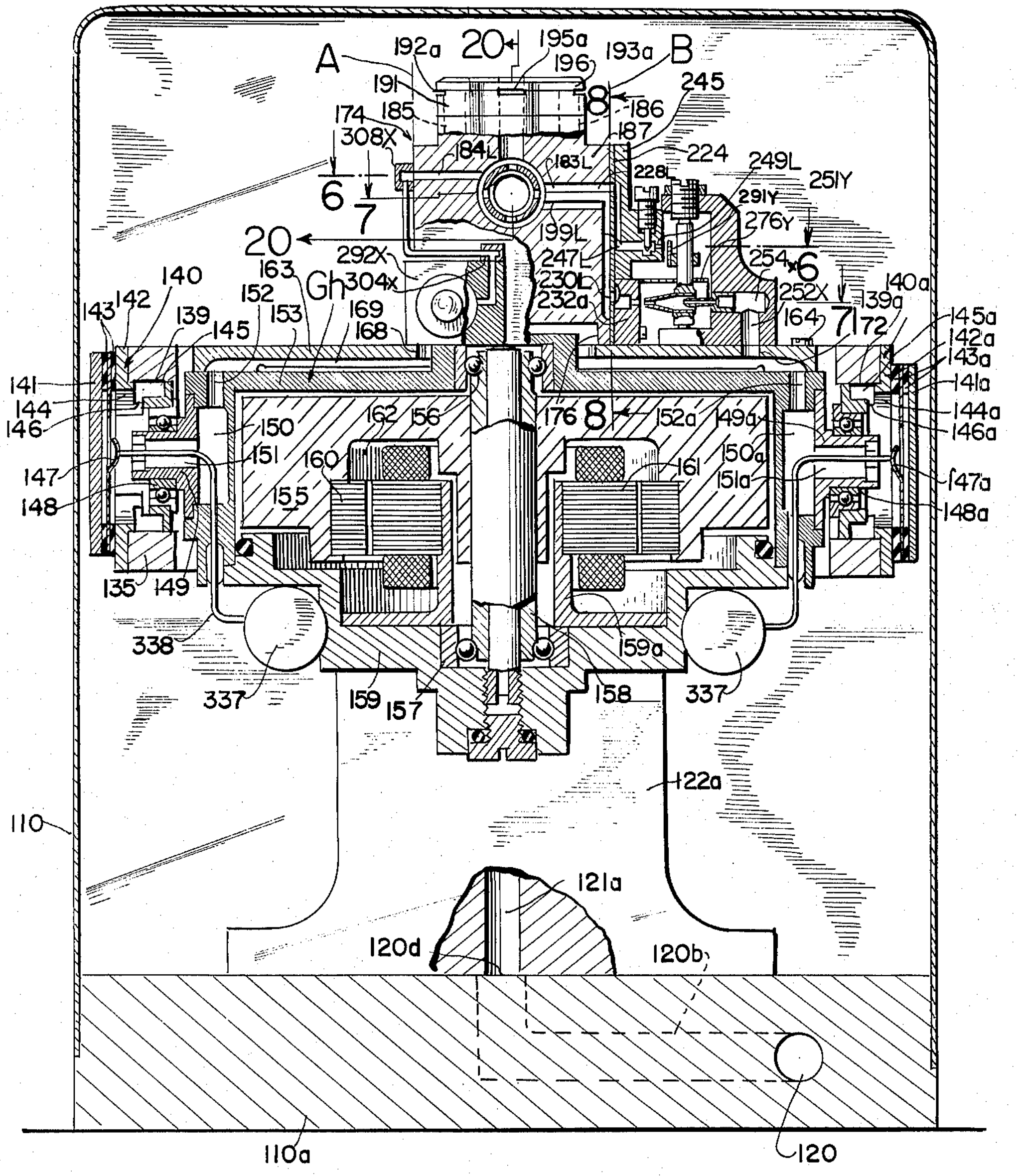
FIGURE 4 is a vertical sectional view taken along the plane of line 4—4 of FIGURE 3.
Figure 5:
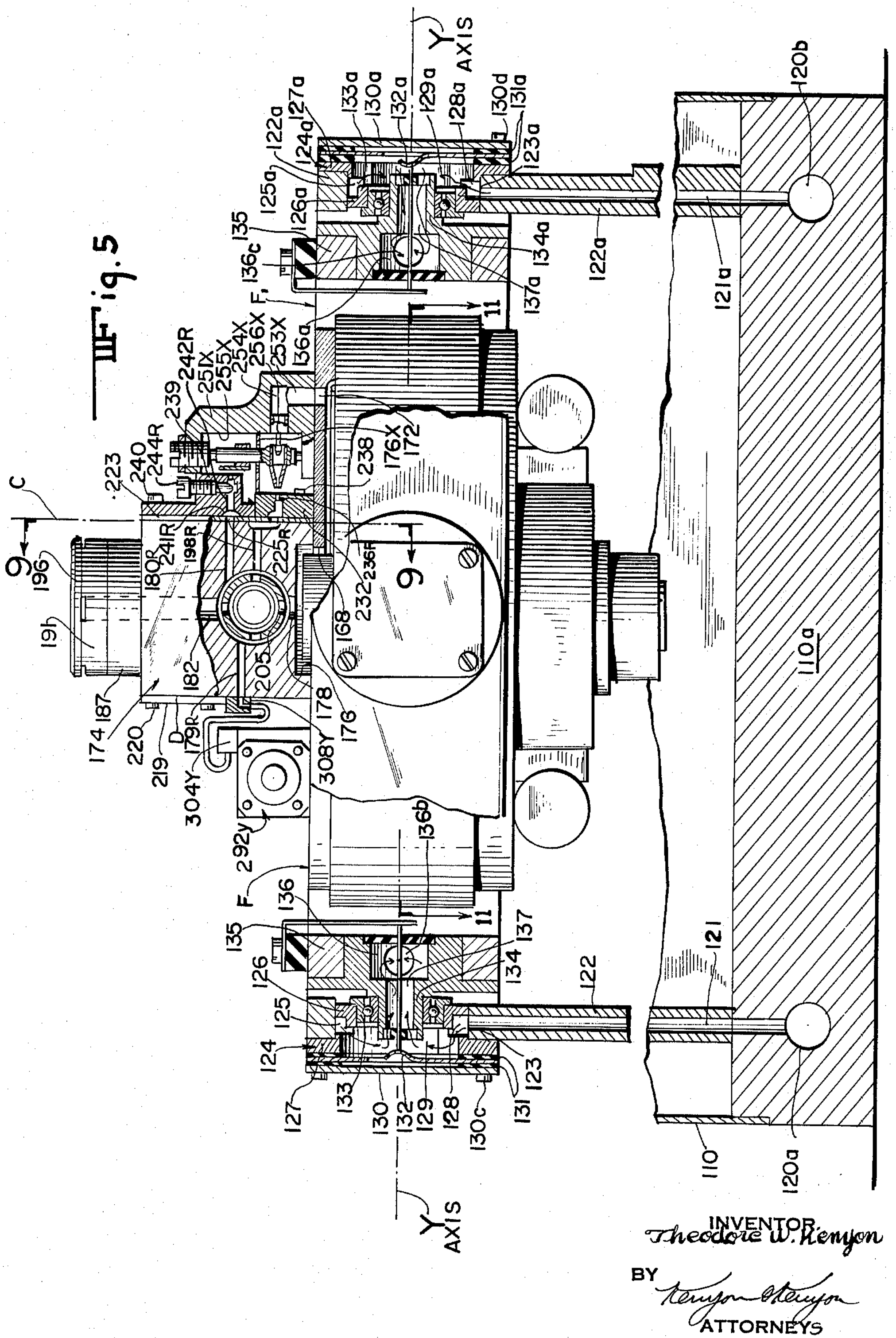
FIGURE 5 is a fragmentary vertical sectional view taken along the plane of line 5—5 of FIGURE 3.
Figures 9, 10, 11, 12:
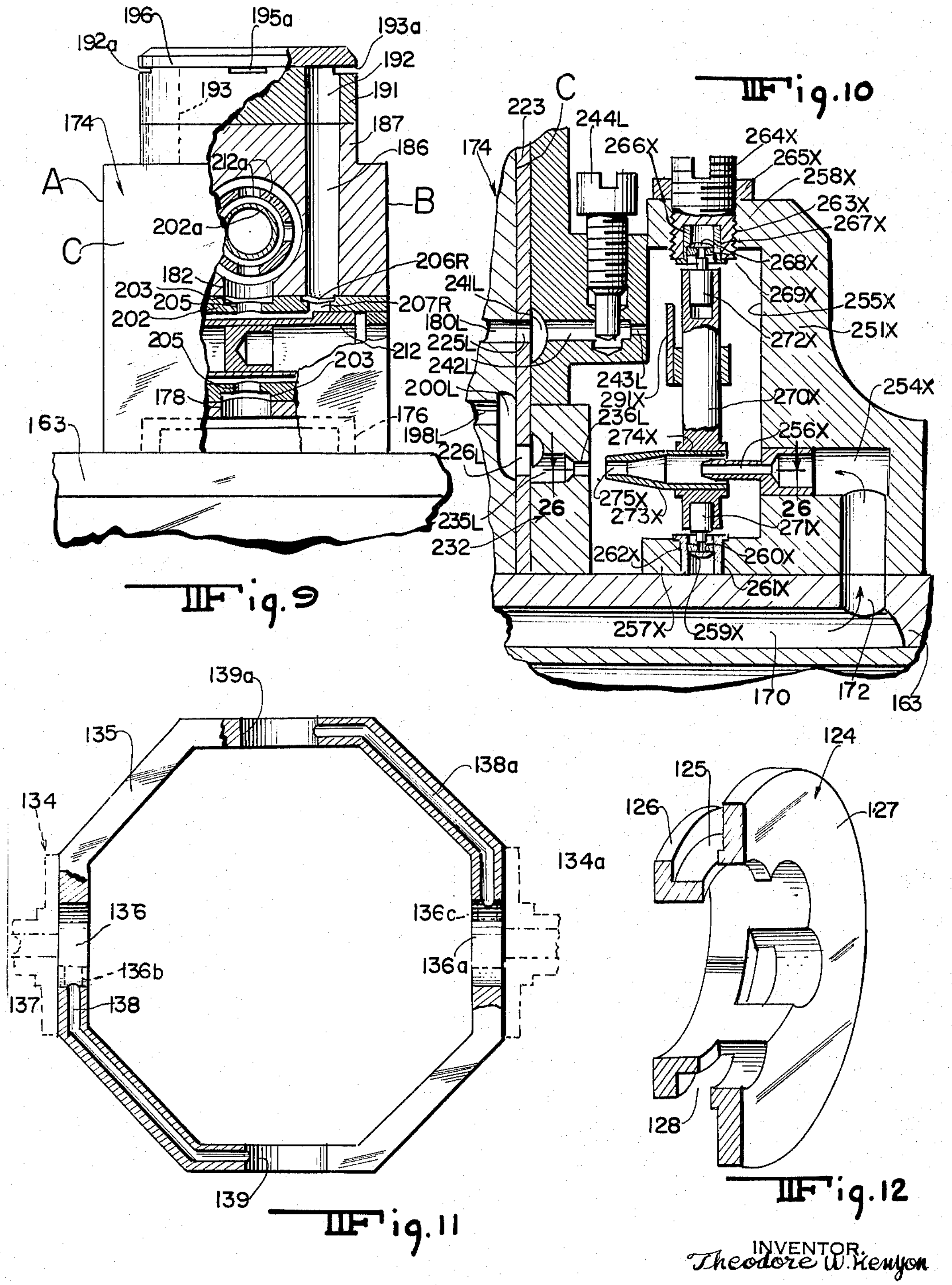
FIGURE 9 is a fragmentary vertical perspective view taken along the plane of line 9—9 of FIGURE 5.
FIGURE 10 is an enlarged fragmentary vertical sectional view of valve details shown in FIGURE 5.
FIGURE 11 is a horizontal sectional view taken along the plane of line 11—11 of FIGURE 5.
FIGURE 12 is a fragmentary partially sectionalized perspective view of an outer gimbal bearing suport.

Ball bearings 133 and 133*a* are mounted respectively, within the tubular supports 124 and 124*a* and there serve as mounts for the diametrically disposed tubular trunnions 134 or 134*a* of the outer gimbal 135 of gyro *Ga* (FIGS. 5 and 11). The trunnions 134 and 134*a* are provided with the respective chambers 136 and 136*a* which communicate respectively with the center bores 137 and 137*a* of the respective trunnions 134 and 134*a*. These chambers 136 and 136*a* respectively communicate via openings 136*b* and 136*c* (FIG. 11) with open ends of respective passageways 138 and 138*a* in the gimbal frame 135. The other ends of passageways 138 and 138*a* open respectively into the diametrically opposite bearing openings 139 and 139*a* in the said outer gimbal frame 135 (see FIGS. 4 and 11).

Tubular ball bearing supports 140 and 140*a* (FIG. 4) of substantially identical construction with the bearing supports 124 and 124*a* are positioned in the bearing openings 139 and 139*a* of outer gimbal 135. The outer ends of the central openings in the supports 140 and 140*a* are closed off by cover plates 141 and 141*a* (FIG. 4) which are insulatively separated from the outer flanges 142 and 142*a* of said supports 140 and 140*a* by pairs of packing and insulating rings 143 and 143*a*, defining the respective chambers 144 and 144*a* which communicate respectively with the annular grooves 145 and 145*a* of the bearing supports 140 and 140*a* via ports 146 and 146*a*. The said annular grooves 145 and 145*a* respectively communicate with the second open ends of passageways 138 and 138*a* of the gimbal 135 (FIG. 11). Contact springs 147 and 147*a* (FIG. 4) are insulatively carried between the pairs of insulator rings 143 and 143*a* and project into the respective spaces 144 and 144*a* for purposes presently to be described.

Ball bearings 148 and 148*a* are mounted within the tubular bearing supports 140 and 140*a* and these serve as mounts for the diametrically disposed hollow or tubular trunnions 149 and 149*a* of the inner gimbal or rotor frame *Gh*. This frame *Gh* is provided with the respective chambers 150, 150*a* which communicate respectively with the bores 151, 151*a* of the respective hollow trunnions 149 and 149*a*. These chambers 150 and 150*a* in turn communicate with respective passageways 152, 152*a* provided in the cover 153 of the rotor frame *Gh* and the open delivery terminals of these passageways are disposed in the upper surface of cover 153.

The inner gimbal or rotor frame *Gh* encloses an electrically driven gyro rotor wheel 155 supported by ball bearings 156, 157 to spin about its normally vertical shaft 158 which extends transversely between the cover 153 and bottom 159 of the rotor covering frame *Gh*. The rotor wheel 155 is provided with a conventional rotor 160 which cooperates inductively with stator windings 161 supported concentrically about the shaft 158 within a space 162 provided in the rotor wheel 155 so that appropriate electric energization of the stator windings 161 and rotor 160 will cause the rotor wheel 155 to spin preferably clockwise about shaft 158.

With the arrangement thus far described, the outer gimbal ring is supported by its trunnions 134 and 134a to be freely rotatable about the Y—Y roll axis of the device on which the gyro is mounted while the inner gimbal or rotor housing or rotor frame G*h* supported by its trunnions 151, 151a to be freely rotatable about the pitch or X—X of said device, which is displaced 90° from the roll axis.

The liquid 111 within casing 110 which pumped by pump 114 to the distributing passageways 120, 120a and 120b is, via the various passageways and ports hereinabove described able to reach the outlets 152 and 152a in the cover 153 of the rotor housing or frame G*h* in any and all pitch or roll positions of the outer gimbal frame 135 and of the inner gimbal or rotor housing frame G*h*.

*Erector system*

The jet erector system 112 is carried on the top surface S of the cover 153 of the inner gimbal or rotor frame G*h* being preferably centered relative to the shaft 158.

Figure 18:
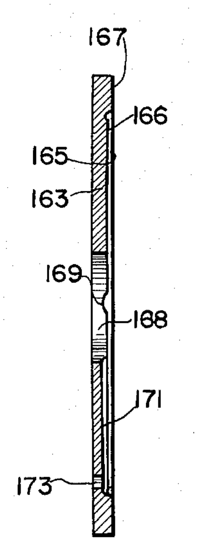
FIGURE 18 is a transverse sectional view of the base plate of the erection device.
Figure 19:
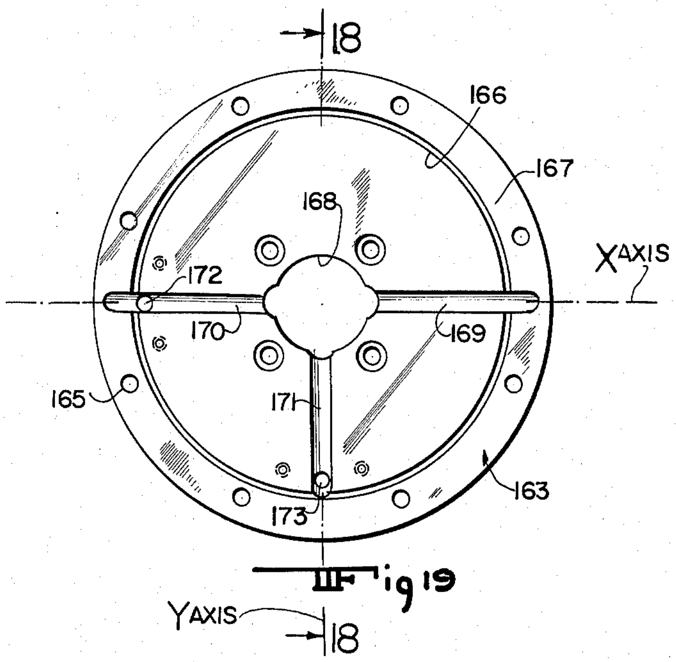
FIGURE 19 is a plan view of said base plate viewed from the right of FIGURE 18.

This jet erector system 112 includes an erector body base plate 163 (FIGS. 4, 5, 18 and 19) secured as by bolts 164 passing through holes 165 to the upper face of rotor frame cover plate 153. This base plate 163 is undercut at 166 (FIG. 18) to define an annular rim 167 which rests firmly on the surface of cover plate 153. The undercut 166 is primarily to better leak-proof contact between the rim 167 and surface of the cover plate 153 allowing for non-flatness of said cover plate. A central hole 168 is provided in the base plate 163. Oppositely extending channels 169 and 170 and a third channel 171 perpendicular to the channels 169 and 170 are provided in the base plate 163. The channels 169, 170 and 171 extend radially outwardly from the center hole 168 terminating short of the outer periphery of base plate 163. Their inner ends communicate with hole 168. Passage holes 172 and 173 in the base plate 163 are located near the outer ends of channels 170 and 171 and open into the upper outer surface of base plate 163 (FIGS. 4, 5 and 18).

*Erector body block*

Figure 8:
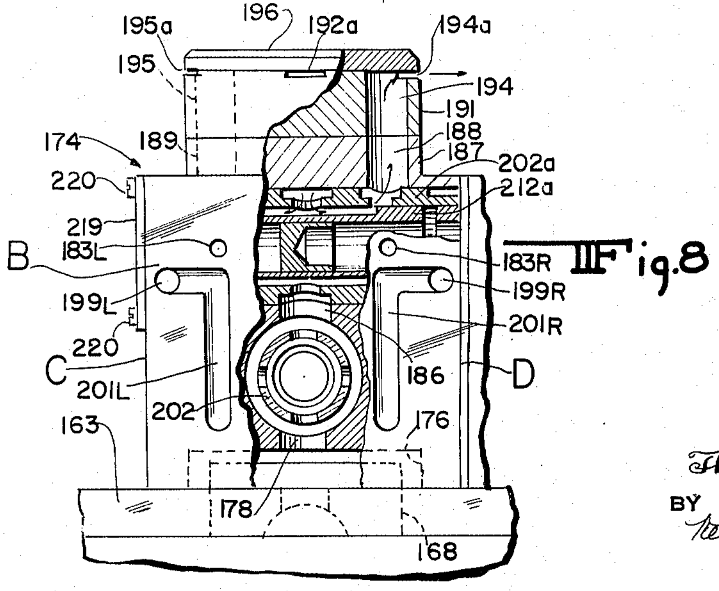
FIGURE 8 is a fragmentary vertical sectional view taken along the plane of line 8—8 of FIGURE 4.
Figure 7:
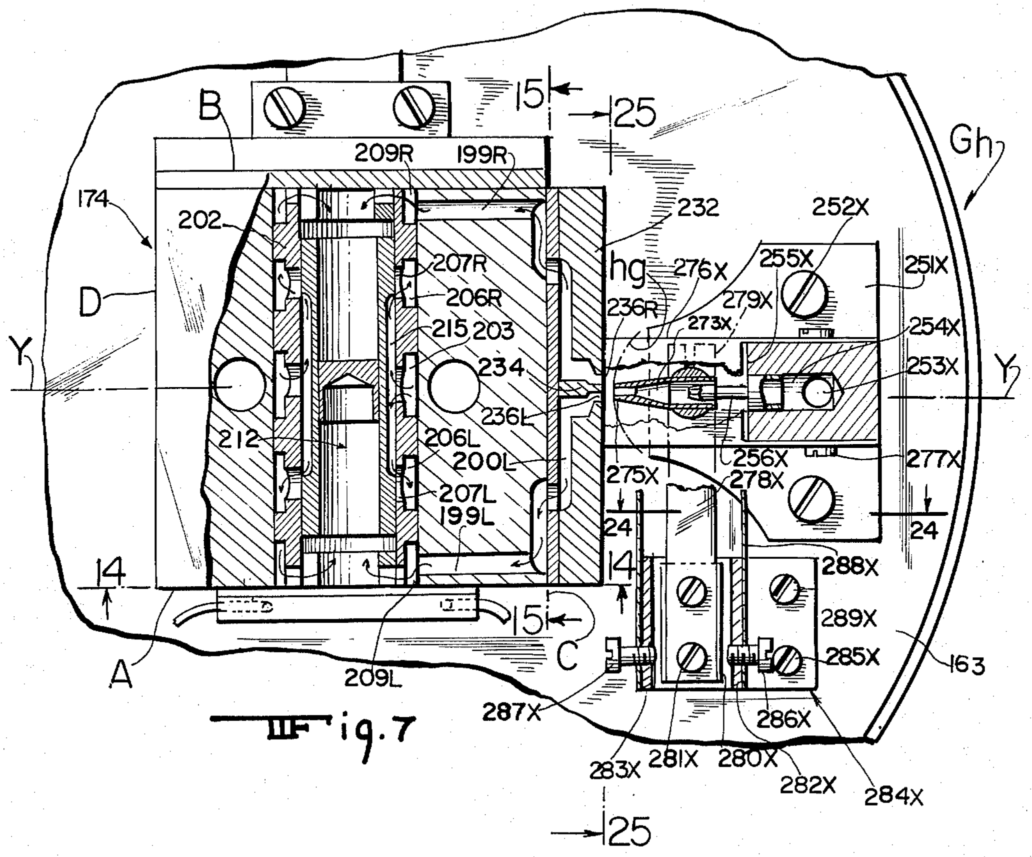
FIGURE 7 is a fragmentary horizontal sectional view taken along the plane of line 7—7 of FIGURE 4.

An erector body block 174 of generally cubical configuration is secured to the erector base plate 163 as by the bolts 175 (FIGS. 3, 4, 5, 6–10 and 13–16 inclusive) so that its opposite pairs of side faces A, B and C, D, are respectively perpendicular to the Y—Y and X—X axes. The bottom face of the erector body block 174 is provided with a centrally located cylindrical recess 176. This recess 176 is positioned to overlie the hole or opening 168 in the erector base plate 163 (FIG. 8) being approximately of the same diameter as the latter.

A transverse, horizontally disposed power piston bore or hole 177 extending through the block 174 from the face A to the face B thereof is provided, this bore being parallel with the X—X gimbal axis. A centrally located vertical hole 178 in block 174 provides communication between recess 176 and said bore 177. (See FIGURES 16 and 17.) Small diametered balancer passageways 179$_L$ and 179$_R$ extending respectively from near opposite ends of bore 177 outwardly to the face D of body block 174 are provided. Other small diametered reaction jet passageways 180$_L$ and 180$_R$ extending respectively from near opposite ends of bore 177 outwardly to face C of body block 174 are provided.

A second transverse horizontally disposed power piston bore or hole 181 extending through the block 174 through from the face C to the face D thereof and perpendicular to bore 177 is provided, this bore being parallel with the Y—Y gimbal axis. A centrally located vertical hole 182 joints bores 177 and 181.

Figures 13, 14, 15, 16, 17:
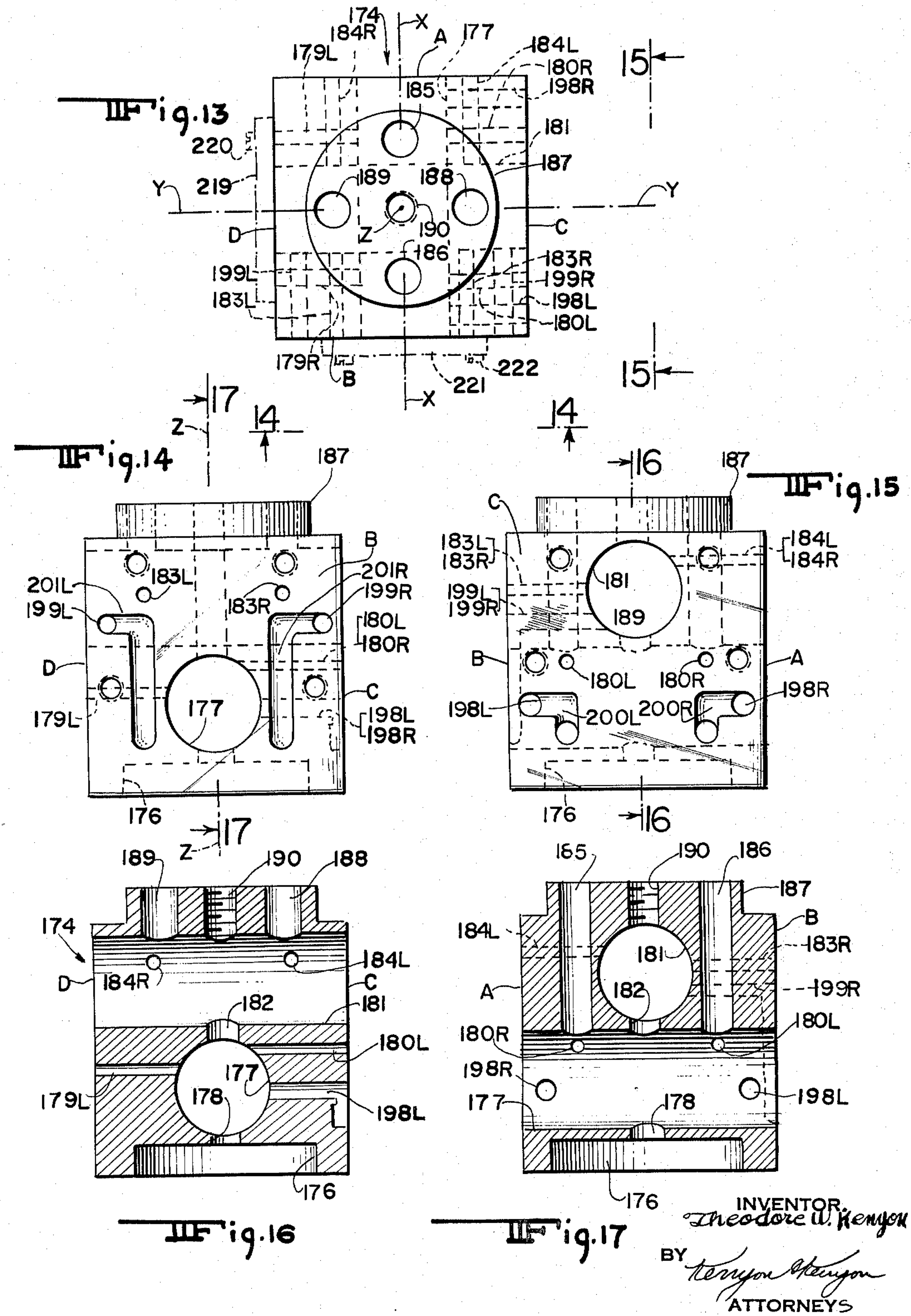
FIGURE 13 is a plan view of the erector body block.
FIGURE 14 is an elevational view of the said block along the plane of line 14—14 of FIGURE 7.
FIGURE 15 is an elevational view of the said block seen along the plane of line 15—15 of FIGURE 13.
FIGURE 16 is a fragmentary sectional view taken along the plane of line 16—16 of FIGURE 15.
FIGURE 17 is a fragmentary sectional view similar to that of FIGURE 16 taken along the plane of line 17—17 of FIGURE 14.

Balancer openings or passageways 183$_L$ and 183$_R$ near opposite ends of the bore 181 extend laterally from said bore 181 to the face B of said block (FIGS. 13 and 15). Other small diametered reaction jet passageways 184$_L$ and 184$_R$ extending respectively from near opposite ends of bore 181 outwardly to face A of body block 174 are provided (FIGS. 13, 15 and 16).

A pair of spaced-apart erection jet flow vertical holes or passages 185 and 186 (FIGS. 3, 4, 5, 8, 9 and 13–17 inclusive) extend upwardly from the bore 177 to the upper surface of a substantially cylindrical extension 187 of block 174 at its top. A similar pair of spaced-apart erection jet flow vertical holes or passageways 188 and 189 extend upwardly from bore 181 to the upper surface of said cylindrical extension 187. The four upper open ends of these holes or passageways 185, 186 and 188, 189 as seen clearly in FIG. 13 lie 90° apart and are concentrically disposed relative to the central vertical axis Z—Z of block 174, which axis is aligned with the axis of the rotor shaft 158. The cylindrical extension 187 has a threaded hole 190 aligned with its axis Z—Z.

A cylindrical block 191 (FIGS. 3, 4, 5, 8 and 9), the same diameter as block extension 187 is positioned to overlie the latter. This block 191 has four vertically extending passages or holes 192, 193, 194 and 195 of the same diameter as and registering respectively with the holes or passageways 185, 186, 188 and 189 serving as continuations of the latter. The upper ends of holes or passageways 192, 193, 194 and 195 terminate in the upper surface of block 191. They are provided respectively with substantially rectangular independent, laterally directed erector jet orifice channels or passageways 192a, 193a, 194a, and 195a which open respectively at 90° spaced apart points in the cylindrical surface of block 191. Jet orifices 192a and 193a are diametrically opposed and in line with the X—X axis of the gyro G*a* while jet orifices 194a and 195a are diametrically opposed and in line with the Y—Y axis of the gyro G*a*. A cover disk or plate 196 overlies the top surface of block 191 and its bottom face provides the covering walls for the independent erector jet orifices 192a, 193a, 194a and 195a. The cover plate 196 and the block 191 are secured to the cylindrical extension 187 as by a threaded center bolt 197 (FIGURE 3) which engages the threaded hole 190 (FIG. 16) in said extension 187.

The power cylinder bore 177 in erector body block 174 has a pair of spaced-apart, fluid power input and bleed passageways 198$_L$ and 198$_R$ (FIGS. 14 and 15) located near the opposite ends of said bore 177 and extending laterally therefrom to the outer face C of the block 174. The bore 181 also has a pair of spaced-apart fluid power input and bleed passageways 199$_L$ and 199$_R$ (FIGS. 13–17 inclusive) located near opposite ends of said bore 181 and extending laterally therefrom to the outer face B of the block. The passageways 198$_L$ and 198$_R$ terminate in face C in substantially L-shaped recesses 200$_L$ and 200$_R$ provided in said face C (FIG. 15).

The passageways 199$_L$ and 199$_R$ terminate in face B in substantially L-shaped recesses 201$_L$ and 201$_R$ provided in said face B (FIG. 14).

*Power valve seats and power valves*

Figure 20:
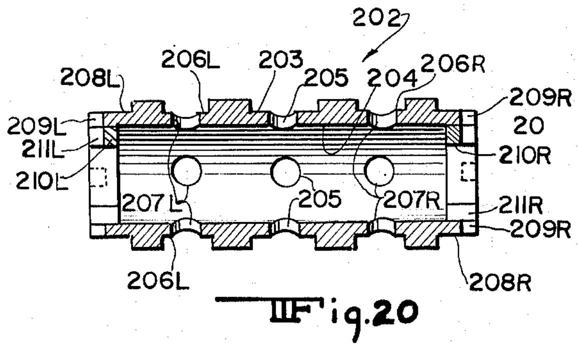
FIGURE 20 is a longitudinal sectional view of a slide valve sleeve of the device seen along the plane of line 20—20 of FIGURE 4.
Figure 21:
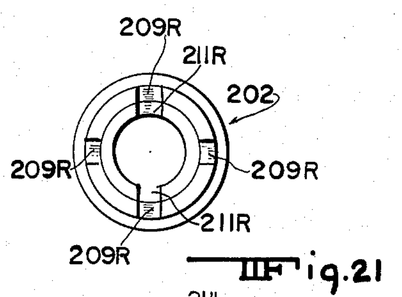
FIGURE 21 is an end elevation of the element of FIGURE 20 seen from the right of FIGURE 20.
Figure 22:
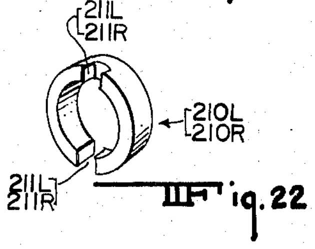
FIGURE 22 is a perspective view of the right end of the element of FIGURE 20.

A tubular valve seat insert or sleeve 202 (FIGS. 20 and 21) is provided for the bore 177. This valve seat 202 has a centrally disposed annular groove 203 in its outer surface which communicates with its center hole or bore 204 via a plurality of wall holes 205. When the valve seat insert 202 is fitted into bore 177, the annular groove 203 lies in direct communication with the passageways or holes 178 and 182 of erector body block 174 (see FIG. 9). The valve seat 202 also has a pair of annular grooves 206$_L$ and 206$_R$ in its outer surface which are equi-spaced from and lie at opposite sides of the annular groove 203. These grooves 206$_L$ and 206$_R$ communicate respectively with the center hole 204 via a plurality of wall holes 207$_L$ and 207$_R$. When valve seat 202 is fitted into bore 177, the annular grooves 206$_L$ and 206$_R$ respectively die in direct communication with the respective erector jet passageways 185 and 186 (see FIG. 9) and also with respective reaction jet passageways $180_L$ and $180_R$. Additional outer annular recesses $208_L$ and $208_R$ are provided at opposite ends of valve seat 202. Radial slots $209_L$ and $209_R$ spaced 90° apart are provided at the opposite ends of sleeve 202.

End stop rings $210_L$ and $210_R$ are fitted into the opposite ends of sleeve valve seat 202. Diametrically disposed radial slots $211_L$ and $211_R$ are provided in these end rings, the said rings being positioned so that their radial slots $211_L$ and $211_R$ lie aligned with a pair of the radial slots $209_L$ and $209_R$ so as to provide direct communication between the recesses $208_L$ and $208_R$ with opposite ends of the valve seat hole 204. The composite length of sleeve valve seat 202 and its end rings $210_L$ and $210_R$ is equal substantially to the length of bore 177 between faces A and B.

Figure 23:
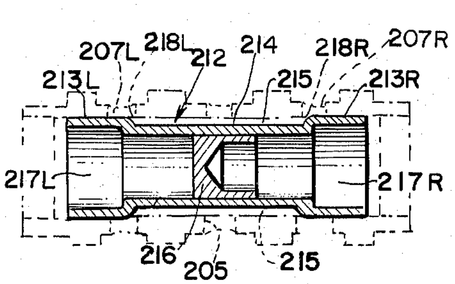
FIGURE 23 is a longitudinal section of a piston element contained within the slide valve sleeve of FIGURE 20.

A power valve 212 (FIG. 23) is fitted slidably within the tubular valve seat insert 202. This valve is a tubular cylindrical body having oppositely located head portions $213_L$ and $213_R$. These head portions have approximately the same external diameter as the inner diameter of the valve seat bore 204 but fit slidably within the latter. A stem part 214 lying between the head portions $213_L$ and $213_R$ is of smaller diameter than the diameter of bore 204 of valve seat 202 and with the surface of said bore defines an annular chamber 215. This chamber 215 is at all times in communication with the input ports 205 in valve seat 202 and also input passageways 178 and 182 (FIGS. 3, 16 and 17), so that chamber 215 is always filled with liquid under pressure which is delivered to said passageway 178 by the pump 114 (FIG. 3) via passageways 120, $120_a$, $120_b$ and 121, $121_a$, chamber 125, $125_a$ (FIG. 5), ports 128, $128_a$, chambers 137, $137_a$, passageways 138, $138_a$ in gimbal ring 135 (FIG. 11) channels 145, $145_a$, ports 146, $146_a$, chambers 144, $144_a$, bores 151, $151_a$ and passages 152, $152_a$ whose oulets open into the recesses 169 and 170 which communicate with hole 168 and then with recess 176 in the erector body bolck 174. The power valve 212 is shorter in length than the tubular valve seat insert 202 so that it may slide reciprocally to and fro between opposite ends of the valve seat bore 204 A transverse partition 216 divides the tubular bore of power valve 212 into two separate chambers $217_R$ and $217_L$ opening respectively toward opposite ends of the valve seat bore 204.

The head portions $213_R$ and $213_L$ of the power valve 212 normally when the latter is in a centrallized position in bore 204 nearly close off the respective port holes $207_L$ and $207_R$ leaving, however, minimal bleed openings $218_R$ and $218_L$ (FIG. 23) into port holes $207_L$ and $207_R$ for purposes presently to be described.

A power valve seat insert or sleeve $202_a$ which is identical with power valve sleeve 202 is provided for the second valve bore 181 (FIG. 4) in the erector body block 174 (FIG. 4). This valve sleeve $202_a$ receives an axially slidable power piston $212_a$ identical in construction with power piston 212. The components of the sleeve $202_a$ and of piston $212_a$ which correspond to those of sleeve 202 and piston 212 bear the same reference characters with the added subscript *a*.

The opposite ends of valve bores 177 and 181 of the erector body block 174 which terminate in the faces A, B, C and D thereof are closed off. The closing off arrangements are best seen in FIGS. 3 to 9 inclusive, 13, 28 and 29. Thus, the end of bore 181 which terminates in face D (FIGS. 5, 8 and 13) of erector body block 174 is closed off by a cover plate 219 secured to the said erector body block 174 as by bolts 220. The end of bore 177 which terminates in face B of said erector body block 174 is closed off by a similar cover plate 221 (FIGS. 6 and 13) secured to said block 174 as by bolts 222.

Figure 28:
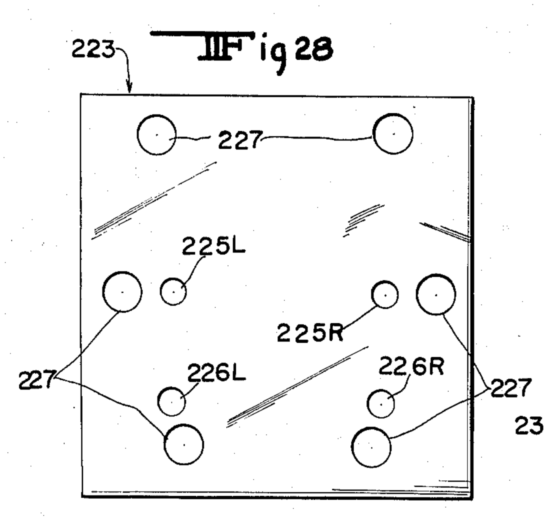
FIGURE 28 is an elevational view of a detail of the erector system.
Figure 29:
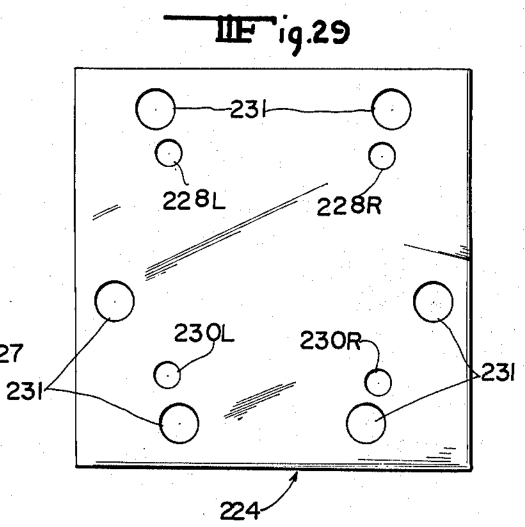
FIGURE 29 is an elevational view of a further detail of said erector system.
Figure 30:
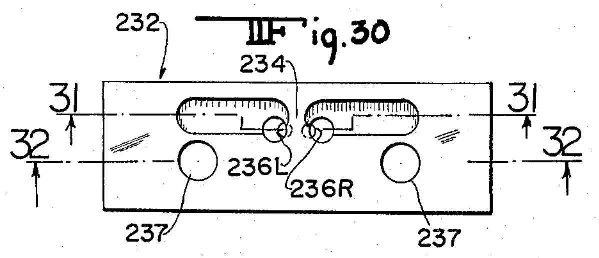
FIGURE 30 is an elevational view of a block receiver detail of the valve-operating system.
Figure 31:
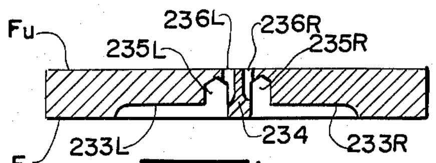
FIGURE 31 is a section taken along the plane of line 31—31 of FIGURE 30.
Figure 32:
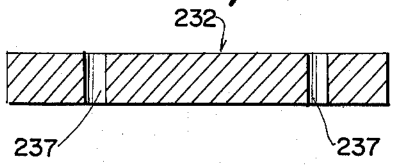
FIGURE 32 is a section taken along the plane of line 32—32 of FIGURE 30.

The opposite end of bore 177 in erector body block 174 which terminates in its face A is closed off by a plate separator 223 (FIG. 28) while the opposite end of bore 181 which terminates in face C of said erector body block 174 is closed off by a plate separator 224 (FIG. 29). The two plate separators 223 and 224 respectively have areas and shapes corresponding to the areas and shapes of the respective faces A and C of said body block 174.

Plate separator 223 has a pair of spaced-apart holes $225_L$ and $225_R$ positioned to lie aligned with the respective outlets of feedback balancer passages $180_L$ and $180_R$ (FIGS. 5 and 28). It also has a pair of spaced-apart holes $226_L$ and $226_R$ that lie aligned with portions of the respective L-shaped fluid power supply passageways $200_L$ and $200_R$ (FIGS. 5, 15 and 28). Bolt holes 227 are also provided in the plate separator 223.

Plate separator 224 (FIG. 29) has a pair of spaced-apart holes $228_L$ and $228_R$ positioned to lie aligned with the respective outlets of feed back balancer passages $183_L$ and $183_R$ (FIGS. 4 and 29). It also has a pair of spaced-apart holes $230_L$ and $230_R$ that are aligned with portions of the respective L-shaped fluid power supply passageways $201_L$ and $201_R$ (FIGS. 4, 14 and 29). Bolt holes 231 also are provided in the plate receiver 224.

*Block receivers (FIGS. 4, 5, 30, 31 and 32)*

Block receivers 232 and $232_a$ of identical construction are mounted respectively on the outer faces of the respective plate separators 223 and 224. As they are identical only block receiver 232 is described, it being understood that corresponding components of block receiver $232_a$ are similarly designated with added subscripts *a*. The block receiver 232 is a substantially rectilinear body (FIGS. 4, 5, 30, 31 and 32). The face $F_L$ thereof that rests on the plate separator 223 is provided with a pair of longitiudinally extending channels or recesses $233_L$ and $233_R$ separated by a partition 234. These channels respectively are aligned with the holes $226_L$ and $226_R$ in the plate receiver 223 so that they communicate with the respective L-shaped slots $200_L$ and $200_R$ in the face C of erector body block 174. Transverse holes or passageways $235_L$ and $235_R$ extend from the respective channels $233_L$ and $233_R$ in block receiver 232 through the latter to its outer face $F_u$ terminating there in open inlet holes $236_L$ and $236_R$. These open inlet holes $236_L$ and $236_R$ lie in a common horizontal plane which is parallel with the X—X axis of the gyro G*a* being spaced apart a small distance for example .032 inch between centers and each being approximately .0260" in diameter. The portion of the partition 234 between these holes $236_L$ and $236_R$ is approximately .006" thick. It is understood, of course, that these dimensions are by way of example only. No intention of limitation to these exact figures is intended. Bolt mounting holes 237 are provided in block receiver 232 which are intended to lie aligned with a corresponding pair of the bolt holes 227 in plate separator 223 so that the latter and the block receiver 232 may be mounted on the face C of erector body block 174 by common bolts 238 (FIG. 5).

Figure 26:
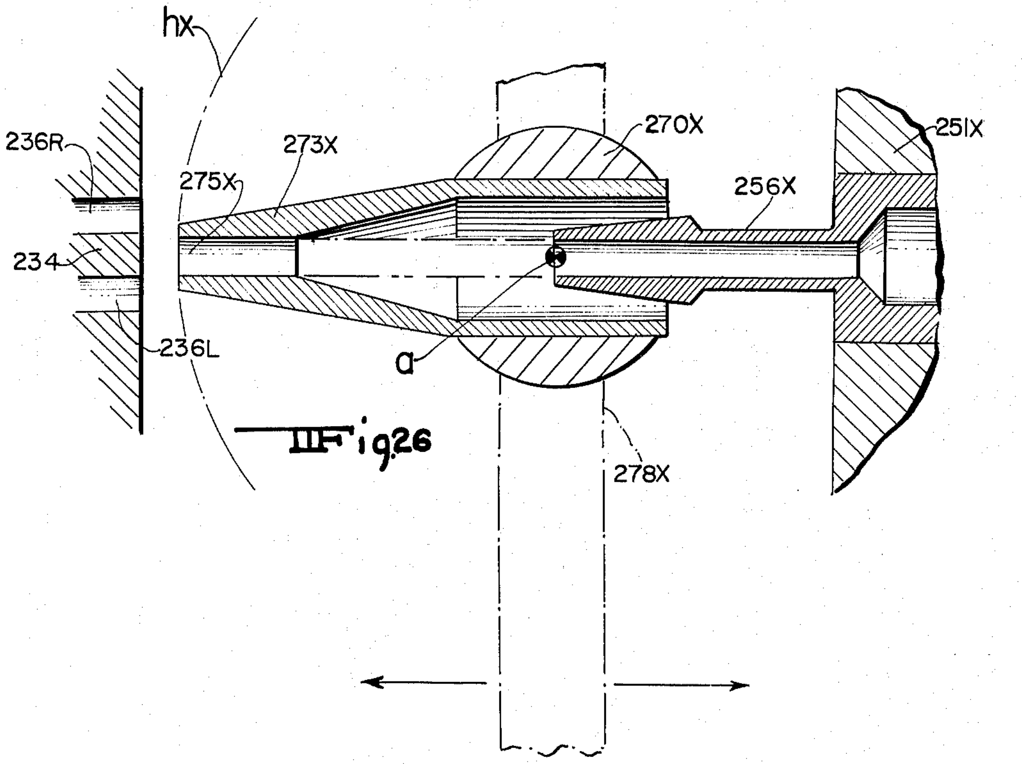
FIGURE 26 is an enlarged fragmentary horizontal section taken along the plane of line 26—26 of FIGURE 10.

The second block receiver $232_a$ is mounted on the face of plate separator 224 and with the latter to the face B of the erector body block 174 by common bolts $238_a$ (FIG. 4). The channels $233_{La}$ and $233_{Ra}$ of this block receiver lie aligned respectively with the holes $230_L$ and $230_R$ (FIGS. 4 and 26). Its two inlet holes $236_{La}$ and $236_{Ra}$ lie in a common horizontal plane which is parallel with the Y—Y axis of the gyro G*a*.

*Feed-back arrangements*

A feedback block 239 (FIGS. 5 and 6) is also mounted on the outer face of plate separator 223 and with it to erector body block 174 as by bolts 240. This feedback block 239 lies above the block receiver 232. It includes a pair of separate horizontally disposed separate channels $241_L$ and $241_R$ which lie aligned respectively with the feedback holes $225_L$ and $225_R$ in plate separator 223 thus being in communication with the respective feedback passages $180_L$ and $180_R$ in erector body block 174. Transverse passages or feedback holes $242_L$ and $242_R$ terminating in feedback jet outlets $243_L$ and $243_R$ in the outer face of feedback block 239 are provided in the latter. Needle valves $244_L$ and $244_R$ provide independent adjustable flow controls for feedback fluid flow outwardly of feedback jet outlets $243_L$ and $243_R$. The two feedback jet orifices or outlets $243_L$ and $243_R$ lie spaced apart in a horizontal plane parallel with the surface S of the gyro rotor housing G*h*. These two feedback jet orifices or outlets $243_L$ and $243_R$ are symmetrically disposed relative to the vertical center plane of the feedback block 239.

Figure 6:
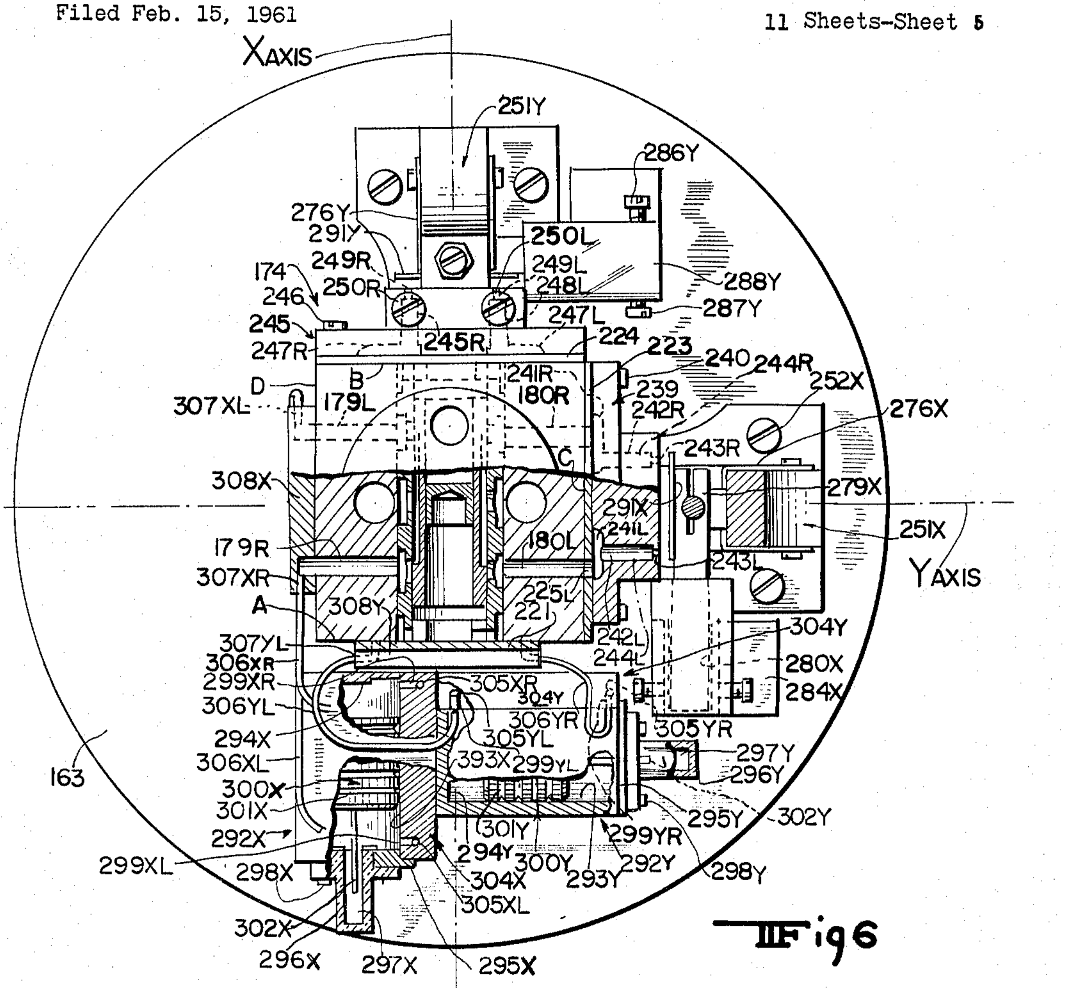
FIGURE 6 is a fragmentary horizontal sectional view taken along the plane of line 6—6 of FIGURE 4.

A similar feedback block 245 is also mounted on the outer face of plate separator 224 and with it to erector body block 174 as by bolts 246 (FIGS. 4 and 6). This feedback block lies above the block receiver $232_a$. It includes a pair of separate angularly disposed separate channels $247_L$ and $247_R$ (FIGS. 4 and 6) which lie aligned with the respective feedback holes $228_L$ and $228_R$ of the plate separator 224 (FIG. 26) thus being in communication with the respective feedback passages $183_L$ and $183_R$ in erector body block 174. Transverse passages or feedback holes $248_L$ and $248_R$ terminating in jet outlets $249_L$ and $249_R$ in the outer face of feedback block 239 are provided in the latter. Needle valves $250_L$ and $250_R$ provide independent adaptable flow controls for feedback fluid flow outwardly of jet outlets $249_L$ and $249_R$. The two feedback jet outlets or orifices $249_L$ and $249_R$ lie spaced apart in a horizontal plane parallel with surface S of the gyro rotor housing G . These jet outlets or orifices $249_L$ and $249_R$ are symmetrically disposed relative to the vertical center plane of the feedback block 245.

*Sensor systems*

A pair of sensor pivot supports $251_X$ and $251_Y$ are provided (FIGS. 3, 4 and 5). These supports are identical in construction and are mounted on the upper face of the rotor casing cover plate 163. Sensor pivot support $251_X$ (FIGS. 3, 5, 7, 10 and 25) is secured to plate 163 as by bolts $252_X$. It has a vertical passageway $253_X$ that overlies the power fluid input outlet 172 in cover plate 163. A horizontal passageway $254_X$ communicates at its inner end with the vertical passageway $253_X$ and extends to the vertical surface $255_X$ of said support $251_X$ lying there at the same level as the level of the orifices $236_L$ and $236_R$ of the block receiver 232 with its axis centered between said two orifices. A fixed jet $256_X$ (FIGS. 5, 7, 10 and 25) is positioned rigidly in the outlet end of horizontal passageway $254_X$ and projects outwardly of the surface $255_X$ of said support $251_X$ toward the block receiver 232 with its axis centered relative to the partition 234 between the orifices $236_L$ and $236_R$.

A pair of horizontally disposed, vertically spaced-apart pivot supporting flanges $257_X$ and $258_X$ (FIGS. 5 and 10) extend outwardly from face $255_X$ of said sensor pivot support. Flange $257_X$ abuts the top surface of cover plate 163 while flange $258_X$ lies aligned therewith in superposed relationship. A jewel bearing comprising a cap jewel $259_X$ and ring jewel $260_X$ carried by a tubular setting $261_X$ is fitted within a vertical jewel bearing receiving hole $262_X$ provided in flange $257_X$. A vertical tapped hole $263_X$ is provided in the flange $258_X$ which lies vertically aligned with the lower hole $263_X$. A threaded jewel bearing housing $264_X$ is threadably mounted in the tapper vertical hole $263_X$ being provided with a setting nut $265_X$. This housing $264_X$ has a vertical recess $266_X$. A jewel setting $267_X$ including a cap jewel $268_X$ and ring jewel $269_X$ is fitted into the recess $266_X$ of said adjustable housing $264_X$.

A vertical sensor pivot shaft $270_X$ is supported between the vertically aligned fixed jewel bearing setting $261_X$ and adjustable jewel bearing setting $267_X$ as by the oppositely extending hardened steel pintles or pivots $271_X$ and $272_X$ which are fixedly mounted in opposite ends of the pivot shaft $270_X$.

A horizontally tubular sensor jet $273_X$ is fixed in an appropriate horizontal opening $274_X$ in the pivot shaft $270_X$. The axis of this jet $273_X$ lies aligned with the axis of fixed jet $256_X$ and the outlet orifice of the latter projects into the receiving end of sensor jet $273_X$. The jet outlet $275_X$ lies horizontally aligned with the receiving orifices $236_L$ and $236_R$ in the block receiver 232 (FIG. 25) and is intended to be swingable reciprocally on a horizontal arc $k_x$ (FIG. 7) from a central position relative to the partition 234 in clockwise and counterclockwise direction respectively toward and away from the two jet orifices $236_L$ and $236_R$ for purposes of directing jet fluid into the selected one of these two orifices as required by operating conditions presently to be described. The inner diameter of the bore of pivoted sensor jet $273_X$ at its receiving end is substantially larger than the outer diameter of fixed jet $256_X$ which projects into it so as to permit pivotal swing of jet $273_X$ relative to the jet orifices $236_L$ and $236_R$ of the block receiver 232 on the arc $k_x$.

A random flow shield $276_X$ (FIGS. 3, 6, 7 and 24) is secured to the sensor pivot support $251_X$ as by bolts $277_X$. This random flow shield extends from support $251_X$ into contact with the block receiver 232 and surrounds the fixed jet 256 and movable jet 274 as well as orifices $236_L$ and $236_R$ in block receiver 232 to protect all from random flow currents of liquid 111 in casing 110.

Figure 24:
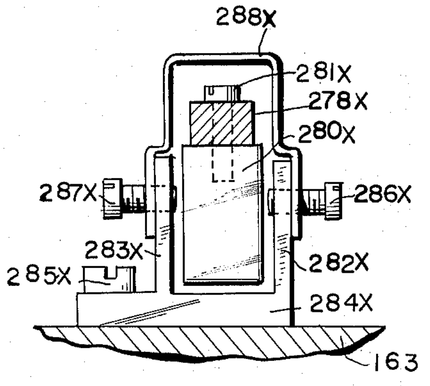
FIGURE 24 is a fragmentary vertical section taken along the plane of line 24—24 of FIGURE 7.
Figure 25:
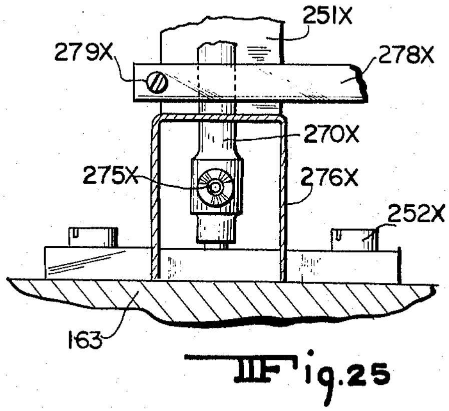
FIGURE 25 is a fragmentary vertical section taken along the plane of line 25—25 of FIGURE 7 and viewed from the left in the direction of the arrows.

A sensor arm or rod $278_X$ (FIGS. 6, 7 and 26) is clamped as at $279_X$ to the pivot shaft $270_X$ above the random flow shield $276_X$. This rod $278_X$ extends horizontally from the pivot shaft $270_X$ at a 90° angle with respect to the common axis of the jets $273_X$ and $256_X$. A pendulum weight $280_X$ (FIG. 24) is secured to the under face of the free end of arm or rod $278_X$ as by bolts $281_X$. This weight $280_X$ is substantially rectilinear in shape and its parallel side faces lie in spaced relationship between the vertical uprights $282_X$, $283_X$ of a dash pot member $284_X$ which latter is secured as by bolts $285_X$ to the cover plate 163 of the rotor housing G*h*. Adjustable limit stop screws $286_X$ and $287_X$ provide travel limits to the clockwise or counterclockwise swing of the pendulum weight $280_X$ and its sensor support arm $278_X$ on the vertical axis of the sensor support shaft $270_X$. A random flow shield $288_X$ is secured to the vertical uprights $282_X$ and $283_X$ and projects therefrom toward the random flow shield $276_X$ (FIG. 7) serving to protect the pendulum weight $280_X$ from the effects of random flow currents of fluid 111 in the casing 110. The pivotal gravity swing of this pendulum weight $280_X$ on the vertical axis of vertical pivot rod $270_X$ is thus influenced by the dash pot effect of escapement of fluid outwardly through the open ends of the shield $288_X$. In normal position when the plane of rotor cover 163 is horizontal, relative to the Y—Y axis, the pendulum weight $280_X$ lies centered between the two stop screws $286_X$ and $287_X$ as shown in FIG. 24 and may swing toward or away from either.

A jet reaction vane or plate $291_X$ (FIG. 6) is secured suitably to the inner side face of sensor arm $278_X$. This reaction vane or plate is substantially rectangular in shape and is admeasured lengthwise to be somewhat longer than the spacing between the reaction jet orifices $243_L$ and $243_R$ of the feedback block 239 lying parallel with the outer face of the latter and disposed symmetrically relative to the vertical axis of sensor support shaft $270_X$ so that reaction jets delivered by said jet orifices $243_L$ and $243_R$ and impinging on said vane or plate $291_X$ will have opposing swing effects on sensor arm $278_X$ about the axis of said sensor support shaft $270_X$.

The sensor pivot support $251_Y$ (FIG. 4) which is identical with sensor pivot support $251_X$ has associated with it a group of components of like kind as those associated with support $251_X$ and as just described, all being identified by like reference characters bearing subscripts *y*.

The reaction vane or plate $291_Y$ of this group of components is located to be influenced by the reaction jets emerging from the reaction jet orifices $249_L$ and $249_R$ (FIG. 6) of feedback block 245 to influence swing of the sensor arm or rod $278_y$ between limits set by the adjustable screw stops $286_y$ and $287_y$.

*Balancer systems*

Balancer cylinder blocks $292_X$ and $292_Y$ (FIGS. 4, 5, and 6) preferably of aluminum alloy are secured to the rotor housing cover 163 in any appropriate manner so that the axes of their cylinder bores $293_X$, $293_Y$ are in crossed relationship being respectively parallel with the X—X and Y—Y axes of the gyro system. End wall plugs $294_X$, $294_Y$, preferably of aluminum alloy for each of the cylinder blocks $292_X$, $292_Y$ close off one end of each cylinder bore $293_X$, $293_Y$. Headers $295_X$, $295_Y$ close off the opposite ends of the respective bores $293_X$, $293_Y$, said headers being appropriately secured in place as by bolts (not shown) on the respective ends of said cylinder blocks $292_X$, $292_Y$. A tubular transparent viewing cap $296_X$, $296_Y$, for example, of "Plexiglas" or equivalent transparent material is secured in an appropriate hole of each header $295_X$, $295_Y$, these caps being centrally located in said headers. Their longitudinal bores $297_X$, $297_Y$ lie coincident with the axes of the cylinder bores $293_X$, $293_Y$ and are closed off at their outer ends by end walls of said caps. The inner ends of said bores $297_X$, $297_Y$ open into the cylinder bores $293_X$, $293_Y$. These caps are secured as by bolts $298_X$, $298_Y$ to the respective headers $295_X$, $295_Y$. Fluid passageways $299_{XL}$, $299_{XR}$, and $299_{YL}$, $299_{YR}$, are provided in the walls of cylinder blocks $292_X$, $292_Y$ at opposite ends of the respective cylinder bores $293_X$, $293_Y$.

Slidable cylindrical balancer weights $300_X$, $300_Y$, preferably of stainless steel are positioned within the respective cylinder bores $293_X$, $293_Y$. These weights are provided with spaced annular grooves $301_X$, $301_Y$ in their cylindrical surfaces to facilitate free longitudinal sliding motion of the weights $300_X$, $300_Y$, which are shorter in length than the lengths of the bores $293_X$, $293_Y$ within the latter, while providing an oil film seal between the bore chamber portions on opposite sides of the respective weights $300_X$, $300_Y$. Axially disposed sight rods $302_X$, $302_Y$ project from ends of the weights $300_X$, $300_Y$ into the respective transparent viewing caps $296_X$, $296_Y$, wherein their positions may be observed to determine the positions of the respective balance weights $300_X$, $300_Y$ in their cylinder bores $293_X$, $293_Y$ for calibration purposes.

Manifolds $304_X$, $304_Y$, preferably of brass are secured as by bolts (not shown) to the respective cylinder blocks $292_X$, $292_Y$ so as to overlie the respective fluid passageways $299_{XL}$, $299_{XR}$, and $299_{YL}$, $299_{YR}$ of these blocks. These manifolds have respective fluid passageways $305_{XL}$, $305_{XR}$, $305_{YL}$, $305_{YR}$, whose outlets overlie and communicate with the respective fluid passageways $299_{XL}$, $299_{XR}$, $299_{YL}$ and $299_{YR}$. Capillary tubes $306_{XL}$, $306_{XR}$, $306_{YL}$ and $306_{YR}$ preferably of soft copper having, for example, .008" I.D. have one of their ends respectively connected to the inlets of respective fluid passages $305_{XL}$, $305_{XR}$, $305_{YL}$, $305_{YR}$ of the two manifolds $304_X$, $304_Y$.

The other ends of capillary tubes $306_{XL}$ and $306_{XR}$ (FIG. 6) are connected to the outlets of respective passageways $307_{XL}$, $307_{XR}$ in a manifold $308_X$, preferably of brass, which latter is secured to the face D of erector body block 174 as by bolts (not shown) so that the inlets of said passageways $307_{XL}$, $307_{XR}$ respectively overlie and communicate with the outlets of respective balancer passageways $179_L$ and $179_R$ in said erector body block 174. Similarly, the other ends of capillary tubes $306_{YL}$ and $306_{YR}$ are connected to the outlets of respective passageways $307_{YL}$, $307_{YR}$ in a manifold $308_Y$, preferably of brass, which latter is secured to the face B of erector body block 174 as by bolts (not shown) so that the inlets of said passageways $307_{YL}$ and $307_{YR}$ respectively overlie and communicate with the respective balancer passageways $183_L$ and $183_R$ in said erector body block 174.

In this way, balancer fluid may flow to and from the appropriate power piston chambers 177 and 181 in the erector body block 174 via capillary tubes $306_{XL}$, $306_{XR}$, $306_{YL}$, $306_{YR}$ to the appropriate sides of balancer cylinder bores $293_X$, $293_Y$ to cause longitudinal shifts of respective balance weights $300_X$, $300_Y$ as may be required in operation as will be presently described.

All the components of the erector system, unless otherwise specified herein are preferably of lightweight noncorrosive material, such as aluminum alloy to reduce the weight of the assembly to a minimum and to provide long wear characteristics as well as ruggedness to the structure.

*Electrical system*

Figure 27:
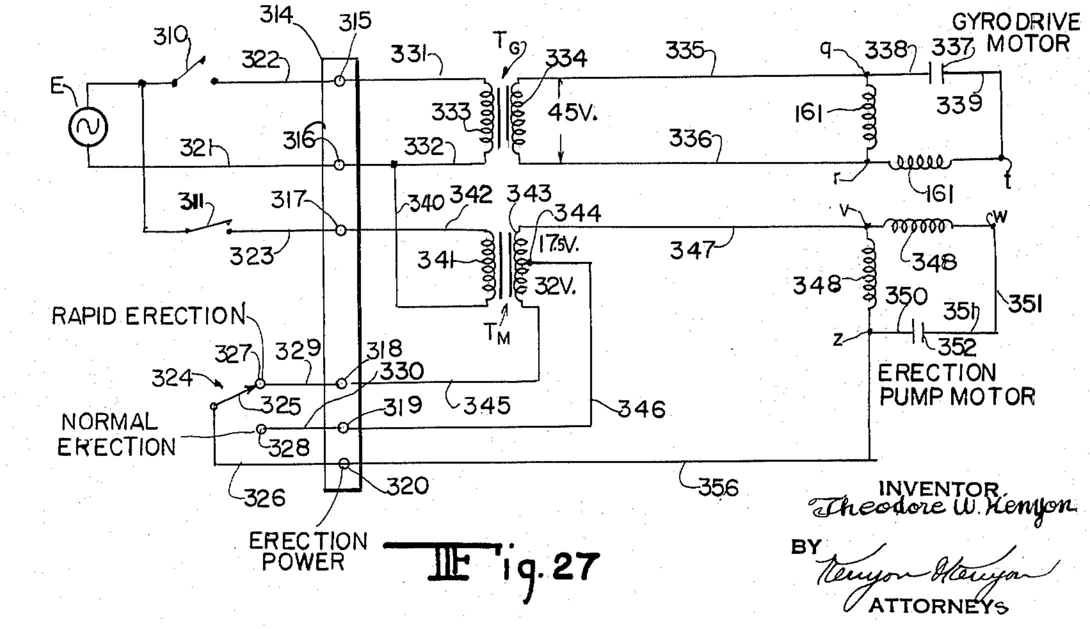
FIGURE 27 is a schematic circuit diagram of the electrical drive system of a gyroscope equipped with the erector arrangement of this invention.

The electrical system for spinning the gyro rotor 155 and for driving the operating motor 113 of the gear pump 114 is shown diagrammatically in FIGURE 27.

A terminal block 314 having separately insulated terminals 315, 316, 317, 318, 319 and 320 is provided. A common A.C. power source E at 400 c.p.s. and 115 v. is connected via switch 310 and lead wire 322 to terminal 315, via lead wire 321 to common terminal 316 and via switch 311 and lead wire 323 to terminal 317.

A single pole, multiple throw switch 324 has its movable blade 325 connected to terminal 320 by a lead wire 326 while its two contacts 327 and 328 are respectively connected by lead wires 329 and 330 to the terminals 318 and 319.

The terminals 315 and 316 are connected by lead wires 331 and 332 to the primary coil 333 of the gyro power supplying step down transformer $T_g$. The secondary coil 334 of this transformer providing 45 v. at 400 c.p.s. is connected by lead wire 335 to one end *q* of the stator field coil or winding 161 and by lead wire 336 to the center tap *r* of stator field coil 161. A condenser 337 is connected by leads 338 and 339 across the ends *t* and *q* of the stator winding 161. With these connections, the rotor wheel 155 is driven in clockwise direction. In the practical embodiment of the invention, the condenser 337 is secured to the bottom portion of the rotor housing 159 (FIG. 4). The connections of the lead wires 335 and 336 to the required parts mounted on the movable gimbal rotor frame G*h* is effected through the agency of contact springs 132, $132_a$, 147, $147_a$, associated contact pins and slip rings all in well known manner so that required electrical connections may be effected without interfering in any way with rotor rotation or free movement of the outer gimbal 135 or the inner gimbal or rotor frame G*h*, or of the rotor wheel 155. Any suitable arrangement for effecting this may be utilized.

The electric power for driving the erection pump motor is also derived from the common source E. To this end, the common terminal 316 is connected by lead wire 340 to one end of the primary coil 341 of a step-down transformer $T_M$. The other end of this primary is connected by lead wire 342 to the terminal 317. Thus, the primary coil 341 is energized at 115 v. at 400 c.p.s. from source E. The secondary coil 343 is in this embodiment designed to produce 32 v. at 400 c.p.s. between its two outermost ends and 17.5 v. at 400 c.p.s. at an intermediate tap point 344. One of the outer terminals of coil 343 is connected by lead wire 345 to terminal 318. The 17.5 v. tap point 344 is connected by lead wire 346 to the terminal 319. The other outer end of secondary coil 343 is connected by lead wire 347 to the center junction V of the stator coil 348 or the erection pump motor 113. The ends W and Z of these stator coils are connected by leads 350, 351 to opposite plates of a condenser 352, and lead 350 as well as the end Z of stator coil 348 are connected by lead wire 356 to the terminal 320. The switch blade 325 thus may be operated to supply the stator field coils 348, either with 32 v. at 400 c.p.s. when switch blade 325 is in contact with switch contact 327, or with 17.5 v. at 400 c.p.s. when blade 325 is moved into contact with contact 328, thus providing two drive speeds for the erection motor 113, fast speed at 32 v. and slower speed at 17.5 v.

*Operation of practical embodiment*

Assuming that the gyro G*a* is initially in true vertical condition both with respect to the X—X and Y—Y gimbal axes and that the sensor weights $280_X$ and $280_Y$ respectively lie centrallized between their respective pairs of limit stops $286_X$, $287_X$ and $286_Y$, $287_Y$, in this condition the movable jets $273_X$ and $273_Y$ lie centered between the respective pairs of power inlet orifices $236_L$, $236_R$, and $236_{La}$ and $236_{Ra}$ of the respective block receivers 232 and 232*a*. At this time, too, the power pistons 212 and 212*a* lie centralized in their respective valve sleeves 202 and 202*a*. Also, at this time, the balancer weights $300_X$ and $300_Y$ lie substantially in centrallized positions within their respective balancer chambers $292_X$ and $292_Y$. In other words, all of the movable components are in centrallized positions. The gyro rotor wheel 155 is now energized from the power source E and rotates preferably in clockwise direction. The pump motor 113 is now turned on by moving switch blade 325 into circuit-closing condition with switch contact 327 providing high speed operation of the pump motor 113. The fluid pumped from the casing 110 into its delivery conduit 118 passes from the latter via the passageway 120 and its branch passages 120*a* upwardly through the gyro supports 122, 122*a* and through the various interconnected passageways hereinabove described reaches the respective chambers 215 and 215*a* of the two power valve systems. Because of the bleed arrangements between the pistons and the respective ports $206_L$, $206_R$ and $206a_L$ and $206a_R$, the bleed fluid under pressure appears at all the erection jet orifices 192*a*, 193*a*, 194*a* and 195*a*. At this time, also, bleed reaction fluid appears at the feedback reaction jet orifices $243_L$, $243_R$ and $249_L$, $249_R$. The bleed jet fluid streams delivered by these respective outlets strike the respective jet reaction vanes $291_X$ and $291_Y$. The needle valves $244_L$, $244_R$ and $250_L$, $250_R$ are now adjusted carefully to insure the centrallized positions of the sensor weights $280_X$ and $280_Y$ between their respective limit stops. The balance weights $300_X$ and $300_Y$ are initially positioned in assembly proximate to centrallized positions in their balance cylinders $292_X$ and $292_Y$. Thus, the pressures on opposite sides of these weights in the cylinders provided by the capillary tubes positions them automatically to gyro balance conditions. In this condition, the shaft 158 of the gyro rotor is vertical.

Assume now that a tilt of the plane F—F′ (FIG. 5) if the surface of the gyro rotor casing cover 153 occurs about the X—X axis so that F′ lies between horizontal and F above horizontal. This tilt causes the sensor weight $281_X$ to swing counterclockwise from its centrallized position shown in FIG. 7 toward its limit stop $286_X$. This immediately causes its movable jet orifice $275_X$ to swing toward alignment with the power inlet $236_L$ in the block receiver 232. Thus, fluid under pressure passes via passages $200_L$ and $199_L$ in the erector body block and port $209_L$ to the lefthand side of the power piston 212 causing it to shift toward the right. This rightward shift of the power valve piston 202 causes complete closure of the ports $207_L$ and opening of the ports $207_R$. In consequence, fluid from the chamber 215 can flow freely via the ports $207_R$ to the jet outlet 192*a*. At the same time, reaction jet fluid can flow in passage $180_R$ to the reaction jet orifice $243_R$. The erector jet flowing from the erection jet orifice 192*a* acts to provide an erection torque with the main body of fluid 111 in the container tending to restore the tilted gyro axle 158 to vertical. At the same time, the reaction jet flowing from jet orifice $243_R$ against the vane $291_X$ tends to act counter to the gravitational tilt of the sensor weight $281_X$ tending to restore the power jet $275_X$ to a centrallized position at which time all the parts move again toward their centrallized initial conditions when erection is complete.

If the tilt should occur so that F′ is above horizontal and F is below horizontal, the shift of the power piston 202 will be in the opposite direction and the erector jet orifice becoming operative will be erector jet 193*a* rather than erector jet 192*a*. The same type of erector action occurs with respect to the Y—Y axis with the power piston 202*a* being the one then in operation and the jet orifices 194*a* and 195*a* being those then providing the erector reaction torques with the fluid 111 in the casing 110.

The capillary tubes $306_{XL}$, $306_{XR}$, $306_{YL}$, $306_{YR}$, which are connected through the manifolds $304_X$ and $304_Y$ to opposite sides of the balancer weight cylinders $292_X$ and $292_Y$ are sensitive to pressures at various sides of the respective power pistons 202 and 202*a* and tend to make the balancer weights $300_X$ and $300_Y$ self positioning to maintain the entire system in balance should any conditions occur tending to create unbalance.

It is seen, therefore, that the practical embodiment of this invention provides accurate and careful erection both on the X—X and Y—Y axes of the gyro under all conditions and utilization is made of reaction torques created by the jet streams of fluid discharged from the erector jet orifices 192*a*, 193*a*, 194*a* and 195*a* into the main body of the same jet fluid 111 within the casing 110.

Although specific embodiments of the invention have been described and shown, variations in detail within the scope of the appended claims are possible and are contemplated. There is no intention, therefore, of limitation to the exact disclosure hereinabove presented.

I claim:

1. In combination with a gyroscope, an erector system therefor, said system including jet stream outlets arranged about mutually perpendicular axes, means for directing jet fluid to said outlets, valve means for controlling the discharge of jet fluid from selected of said outlets, pendulum means for operating said valve means, negative feedback means for opposing movement of said pendulum means, container means enclosing the gyroscope and erector system, jet fluid in said container and pumping means within said container for pumping the jet fluid therein to said directing means.

2. In an erector system for gyroscopes, container means enclosing the gyroscope and erector system, jet fluid in said container, jet stream outlets arranged about mutually perpendicular axes, means for directing jet fluid to said outlets, valve means for controlling the discharge of jet fluid from selected of said outlets, gravitationally controlled means for controlling said valve means, negative feedback means for opposing movement of said gravitationally controlled means, and pumping means within said container for pumping the jet fluid therein to said directing means.

3. In an erector system for gyroscopes, container means enclosing the gyroscope and erector system, jet fluid in said container, jet stream outlets arranged about mutually perpendicular axes, conduit means for directing jet fluid to said outlets, valve means for controlling the discharge of jet fluid from selected of said outlets, gravitationally controlled means for controlling said valve means, negative feedback means for opposing movement of said gravitationally controlled means, balancing weight means on said gyroscope, means for altering relative positions of said balancing weight means by integrating portions of a continued unbalanced flow of jet fluid delivered to said conduit means, and pumping means within said container for pumping the jet fluid therein to said conduit means.

4. In an erector system for gyroscopes, container means enclosing the gyroscope and erector system, jet fluid in said container, a universally mounted rotor casing for said gyroscope mounted in said container, a cylinder and a piston member on said casing, a pair of jet stream outlets, a pair of ports in said cylinder, one communicating with each said jet stream outlet, said ports adapted to be differentially opened and closed upon movement of said piston, pumping means for causing continuous jet fluid flow through said cylinder, ports, and outlets, gravitationally responsive means for controlling the position of said piston, and negative feedback means for opposing movement of said gravitationally responsive means.

5. An erector system as defined by claim 4 wherein said cylinder, piston and jet stream outlets are duplicated and said pairs of jet stream outlets are arranged about mutually perpendicular axes to provide erection about two horizontal axes.

6. In an erector system for gyroscopes, container means enclosing the gyroscope and erector system, jet fluid in said container, a universally mounted rotor casing for said gyroscope mounted in said container, a cylinder and a piston member on said casing, a pair of jet stream outlets, a first pair of ports in said cylinder, one communicating with each said jet stream outlet, said ports adapted to be differentially opened and closed upon movement of said piston, a second pair of ports in said cylinder, gravitationally responsive means for directing a stream of jet fluid differentially through selected of said second ports whereby said fluid will cause said piston to be moved, negative feedback means for opposing movement of said gravitationally responsive means and pumping means for causing continuous jet fluid flow through said erector system.

7. An erector system as defined by claim 6 wherein said cylinder, piston, and jet stream outlets are duplicated and said pairs of jet stream outlets are arranged about mutually perpendicular axes to provide erection about two horizontal mutually perpendicular axes.

8. In an erector system for gyroscopes, container means enclosing the gyroscope and erector system, jet fluid in said container, a universally mounted rotor casing for said gyroscope mounted in said container, a cylinder and a piston member on said casing, a pair of jet stream outlets, a first pair of ports in said cylinder, one communicating with each said jet stream outlet, said ports adapted to be differentially opened and closed upon movement of said piston, a second pair of ports in said cylinder, gravitationally responsive means for directing a stream of jet fluid differentially through selected of said second ports whereby said fluid will cause said piston to be moved, pumping means for causing continuous jet fluid flow through said erector system, and negative feedback means for opposing movement of said gravitationally responsive means.

9. In an erector system for gyroscopes, container means enclosing the gyroscope and erector system, jet fluid in said container, a universally mounted rotor casing for said gyroscope mounted in said container, a cylinder and a piston member on said casing, a pair of jet stream outlets, a first pair of ports in said cylinder, one communicating with each said jet stream outlet, said ports adapted to be differentially opened and closed upon movement of said piston, a second pair of ports in said cylinder, gravitationally responsive sensor means for directing a stream of jet fluid differentially through selected of said second ports whereby said fluid will cause said piston to be moved, pumping means for causing continuous jet fluid flow through said erector system, a third pair of ports in said cylinder adapted to be differentially opened and closed upon movement of said piston, and a pair of negative feedback jet stream outlets adapted to oppose movement of said gravitationally responsive means by directing a stream of jet fluid thereon in the opposite direction from its gravitationally induced movement, said third ports communicating with said negative feedback jet stream outlets.

10. An erector system as defined by claim 9 wherein said cylinder, piston and jet stream outlets are duplicated and said pairs of jet stream outlets are arranged about mutually perpendicular axes to provide erection about two horizontal mutually perpendicular axes.

11. In an erector system for gyroscopes, container means enclosing the gyroscope and erector system, jet fluid in said container, a universally mounted rotor casing for said gyroscope mounted in said container, a cylinder and a piston member on said casing, a pair of jet stream outlets, jet fluid conduits connected to said outlets, a first pair of ports in said cylinder, one communicating with each said jet stream outlet, said ports adapted to be differentially opened and closed upon movement of said piston, a second pair of ports in said cylinder, gravitationally responsive sensor means for directing a stream of jet fluid differentially through selected of said second ports whereby said fluid will cause said piston to be moved, pumping means for causing continuous jet fluid flow through said erector system, a third pair of ports in said cylinder adapted to be differentially opened and closed upon movement of said piston, negative feedback conduits connected to said first-named conduits a pair of negative feedback jet stream outlets for said negative feedback conduits adapted to oppose movement of said gravitationally responsive means by directing a stream of jet fluid thereon in the opposite direction from its gravitationally induced movement, said third ports communicating with said negative feedback jet stream outlets, balancing weight means on said gyroscope, and means for altering relative positions of said balancing weight means by integrating portions of a continuous unbalanced flow of jet fluid delivered to said negative feedback conduits.

12. An erector system as defined by claim 11 wherein said cylinder, piston, and jet stream outlets are duplicated and said pairs of jet stream outlets are arranged about mutually perpendicular axes to provide erection about two horizontal mutually perpendicular axes.

13. In an erector system for gyroscopes, container means enclosing the gyroscope and erector system, jet fluid in said container, a universally mounted rotor casing for said gyroscope mounted in said container, a cylinder and a piston member on said casing, a pair of jet stream outlets, a first pair of ports in said cylinder, one communicating with each said jet stream outlet, said ports adapted to be differentially opened and closed upon movement of said piston, a second pair of ports in said cylinder, gravitationally responsive means for directing a stream of jet fluid differentially through selected of said second ports whereby said fluid will cause said piston to be moved, and pumping means for causing continuous jet fluid flow through said erector system, a third pair of ports in said cylinder adapted to be differentially opened and closed upon movement of said piston and a pair of negative feedback jet stream outlets adapted to oppose movement of said gravitationally responsive means by directing a stream of jet fluid thereon in the opposite direction from its gravitationally induced movement, said third ports communicating with said negative feedback jet stream outlets, balancing weight means on said gyroscope, an enclosure for said balancing weight means fixed to said gyroscope wherein said weight is slidable, integrating means including ports in said enclosure for conducting jet fluid from said cylinder to said enclosure whereby the position of said weight in said enclosure is altered when a continued unbalanced flow of jet fluid occurs in said integrating means.

14. An erector system as defined by claim 13 for providing erection action about two horizontal and mutually perpendicular axes wherein said cylinder, piston, jet stream outlets and balancing weight means are duplicated and said pairs of jet stream outlets are arranged about mutually perpendicular axes to provide erection about both said horizontal axes.

15. In an erector system for gyroscopes, container means enclosing the gyroscope and erector system, jet fluid in said container, a universally mounted rotor casing for said gyroscope mounted in said container, a cylinder and a piston member on said casing, a pair of jet stream outlets, a first pair of ports in said cylinder, one communicating with each said jet stream outlet, said ports adapted to be differentially opened and closed upon movement of said piston, a second pair of ports in said cylinder, gravitationally responsive means for directing a stream of jet fluid differentially through selected of said second ports whereby said fluid will cause said piston to be moved, negative feedback means for opposing movement of said gravitationally responsive means and pumping means for causing continuous jet fluid flow through said erector system and filter means associated with said pumping means.

16. In an erector system for gyroscopes, container means enclosing the gyroscope and erector system, jet fluid in said container, jet stream outlets arranged about mutually perpendicular axes, means for directing jet fluid to said outlets, valve means for controlling the discharge of jet fluid from selected of said outlets, gravitationally controlled means for controlling said valve means, balancing weight means on said gyroscope, means for altering relative positions of said balancing weight means by integrating portions of an unbalanced flow of jet fluid delivered to said jet stream outlets, and pumping means within said container for pumping the jet fluid therein to said directing means.

References Cited by the Examiner

UNITED STATES PATENTS

| | | | |
|---|---|---|---|
| 1,096,254 | 5/1914 | Lang | 74—5.43 |
| 2,195,351 | 3/1940 | Ziebolz | 74—5 X |
| 2,311,652 | 2/1943 | Esval | 74—5.43 |
| 2,373,120 | 4/1945 | Kenyon | 74—5.43 |
| 2,486,578 | 11/1949 | Summers | 74—5.43 |
| 2,772,570 | 12/1956 | Judson | 74—5.43 |
| 2,923,161 | 2/1960 | Barkalow | 74—5 |

BROUGHTON G. DURHAM, *Primary Examiner.*

TEN EYCK W. SHEAR, *Assistant Examiner.*